United States Patent
Woodall et al.

[11] Patent Number: 6,085,528
[45] Date of Patent: Jul. 11, 2000

[54] SYSTEM FOR PROCESSING, STORING, AND TRANSPORTING LIQUEFIED NATURAL GAS

[75] Inventors: Robert M. Woodall, The Woodlands; Ronald R. Bowen, Magnolia; Douglas P. Fairchild, Sugar Land, all of Tex.

[73] Assignee: ExxonMobil Upstream Research Company, Houston, Tex.

[21] Appl. No.: 09/099,268

[22] Filed: Jun. 18, 1998

Related U.S. Application Data

[60] Provisional application No. 60/050,280, Jun. 20, 1997, provisional application No. 60/053,966, Jul. 28, 1997, provisional application No. 60/068,226, Dec. 19, 1997, provisional application No. 60/079,904, Mar. 30, 1998, and provisional application No. 60/085,467, May 14, 1998.

[51] Int. Cl.$^7$ .............................. F17C 7/02; F17C 13/08; C22C 38/08
[52] U.S. Cl. .............................. 62/45.1; 62/50.1; 62/53.2; 148/336
[58] Field of Search .................... 62/53.2, 45.1, 62/50.1; 148/336

[56] References Cited

U.S. PATENT DOCUMENTS

| | | | |
|---|---|---|---|
| 2,004,074 | 6/1935 | Kiley | 220/85 |
| 2,795,937 | 6/1957 | Sattler et al. | 62/1 |
| 2,940,268 | 6/1960 | Morrison | 62/7 |
| 3,097,294 | 7/1963 | Kubli et al. | 219/145 |
| 3,232,725 | 2/1966 | Secord et al. | 48/190 |
| 3,298,805 | 1/1967 | Secord et al. | 62/53.2 |
| 3,477,509 | 11/1969 | Arendt | 166/252 |
| 3,535,210 | 10/1970 | Linde et al. | 203/11 |
| 3,745,322 | 7/1973 | Ito et al. | 219/137 |
| 3,853,611 | 12/1974 | Godai et al. | 117/205 |
| 3,864,918 | 2/1975 | Lorenz | 60/651 |
| 3,931,908 | 1/1976 | Cheyney | 220/71 |
| 3,986,340 | 10/1976 | Bivins, Jr. | 62/53 |
| 4,024,720 | 5/1977 | Dimentberg et al. | 62/55 |
| 4,033,135 | 7/1977 | Mandrin | 60/648 |
| 4,068,113 | 1/1978 | Godai et al. | 219/146.23 |
| 4,162,158 | 7/1979 | Hwang et al. | 75/124 |
| 4,182,254 | 1/1980 | Secord | 114/74 |
| 4,257,808 | 3/1981 | Morris, Jr. et al. | 75/123 N |
| 4,266,958 | 5/1981 | Cummings | 62/20 |
| 4,315,407 | 2/1982 | Creed et al. | 62/53 |
| 4,374,478 | 2/1983 | Secord | 73/836.31 |
| 4,459,929 | 7/1984 | Ffooks | 114/74 |
| 4,687,525 | 8/1987 | Biniasz et al. | 148/336 |
| 4,776,900 | 10/1988 | Yano et al. | 148/12 R |
| 5,199,266 | 4/1993 | Johansen | 62/53.2 |
| 5,484,098 | 1/1996 | Anttila et al. | 228/184 |
| 5,531,842 | 7/1996 | Koo et al. | 148/654 |
| 5,545,269 | 8/1996 | Koo et al. | 148/654 |

(List continued on next page.)

FOREIGN PATENT DOCUMENTS

| | | |
|---|---|---|
| 55-107763 | 8/1980 | Japan . |
| 7-331328 | 12/1995 | Japan . |
| 8-176659 | 7/1996 | Japan . |
| WO96/23909 | 8/1996 | Japan . |
| 8-295982 | 11/1996 | Japan . |
| 1522609 | 8/1978 | United Kingdom ............ F17C 11/02 |
| WO 99/47869 | 9/1999 | WIPO . |

OTHER PUBLICATIONS

Reference cited by the Taiwan Patent Office in related application, reference title —"Electronic Welding Operation Handbook Part 1", 1994, pp. 33–41; English language translation of relevant portions as provided by applicant's agent in Taiwan.

(List continued on next page.)

*Primary Examiner*—William Doerrler
*Attorney, Agent, or Firm*—Marcy Lyles

[57] ABSTRACT

A container is provided for storing pressurized liquefied natural gas at a pressure of about 1035 kPa (150 psia) to about 7590 kPa (1100 psia) and at a temperature of about −123° C. (−190° F.) to about −62° C. (−80° F.). The container is constructed from an ultra-high strength, low alloy steel containing less than 9 wt % nickel and having a tensile strength greater than 830 MPa (120 ksi) and a DBTT lower than about −73° C. (−100° F.).

23 Claims, 4 Drawing Sheets

U.S. PATENT DOCUMENTS

| | | | |
|---|---|---|---|
| 5,545,270 | 8/1996 | Koo et al. ................................ | 148/654 |
| 5,755,895 | 5/1998 | Tamehiro et al. ....................... | 148/336 |
| 5,762,119 | 6/1998 | Platz et al. .............................. | 141/231 |
| 5,798,004 | 8/1998 | Tamehiro et al. ...................... | 148/336 |
| 5,878,814 | 3/1999 | Breivik et al. .......................... | 166/267 |
| 5,950,453 | 9/1999 | Bowen et al. ............................ | 62/612 |

OTHER PUBLICATIONS

Reference cited by the Taiwan Patent Office in related application, reference title —"Welding Handbook vol. 2", 1993, pp. 190–195; English language translation of relevant portions as provided by applicant's agent in Taiwan.

K. E. Dorschu et al, "Development of a Filler Metal for a High–Toughness Alloy Plate Steel with a Minimum Yield Strength of 140 ksi", The Welding Journal, Dec. 1964, pp.564s–575s.

G. G. Saunders, "Effect of Major Alloying Elements on the Toughness of High Strength Weld Metal", Welding Research International, vol. 7, No. 2, 1977, pp. 91–118.

S. G. Ladkany, "Composite Aluminum–Fiberglass Epoxy Pressure Vessels for Transportation of LNG at Intermediate Temperature", Published in *Advances in Cryogenic Engineering, Materials, Vol. 28,* (*Proceeding of the 4th International Cryogenic Materials Conference*), San Diego, CA, USA, Aug. 10–14, 1981, pp. 905–913.

Gary W. Van Tassel, "An Economic System for the Liquefaction, Transportation and Regas of Natural Gas Using Surplus LNG Carriers", *The Society of Naval Architects and Marine Engineers*, 1984, pp. 17–1 through 17–7.

Roger Ffooks, "Natural Gas by Sea The Development of a New Technology", published 1983 (second edition) by Witherby & Co. Ltd., Chapter 14, especially pp. 162–164 and 175–176. (month of publication not provided; year of publication is sufficiently earlier than priority date that month of publication not in issue).

R. J. Broeker, "A New Process for the Transportation of Natural Gas", International LNG Conference, Chicago, Apr. 1968.

C. P. Bennett, "Marine Transportation of LNG at intermediate temperature", CME, Mar. 1979.

E. K. Faridany et al., "The Ocean Phoenix Pressure–LNG System", Gastech 1976. (month of publication not provided; year of publication is sufficeintly earlier than priority date that month of publication not in issue).

E. K. M. Faridany et al., "A Pressure LNG System", European Offshore Petroleum Conference & Exhibition, Oct. 21–24, 1980.

Broeker, R. J. "CNG and MLG–New Natural Gas Transportation Process", American Gas Journal, Jul. 1969, vol. 198, No. 8, pp. 45, 48, and 50.

Prof. E. Fluggen and Dr. I. H. Backhause, "Pressurised LNG —and the Utilisation of Small Gas Fields", Gastech 78 LNG/LPG Conference (Monte Carlo, Nov. 7–10, 1978) Proceedings, pp. 195–204.

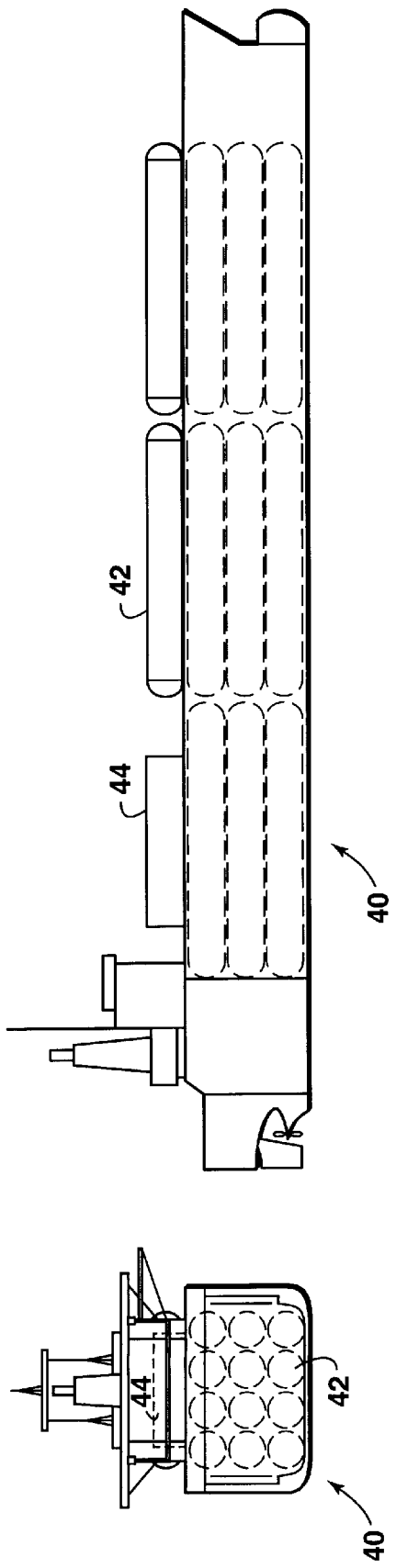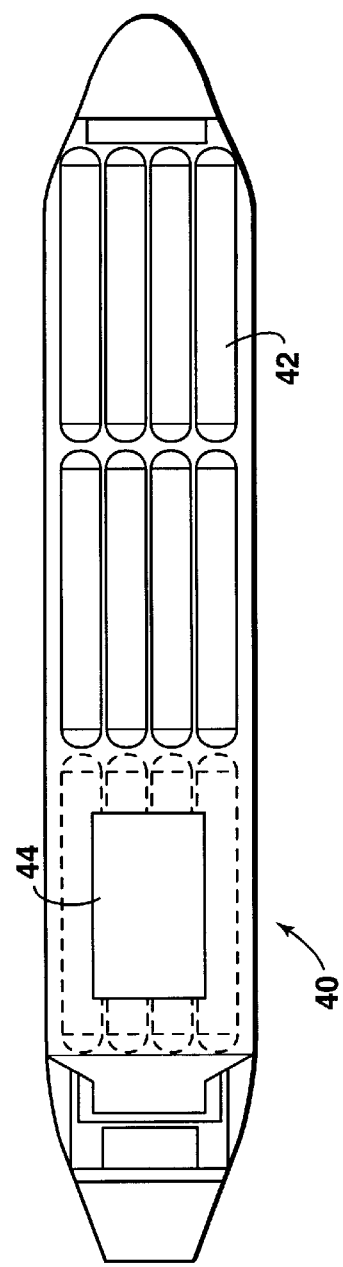

SYSTEM FOR PROCESSING, STORING, AND TRANSPORTING LIQUEFIED NATURAL GAS

This application claims the benefit of (i) U.S. Provisional Application Ser. No. 60/050,280, filed Jun. 20, 1997, (ii) U.S. Provisional Application Ser. No. 60/053,966, filed Jul. 28, 1997, (iii) U.S. Provisional Application Ser. No. 60/068,226 filed Dec. 19, 1997, (iv) U.S. Provisional Application Ser. No. 60/079,904, filed Mar. 30, 1998, and (v) U.S. Provisional Application Ser. No. 60/085,467, filed May 14, 1998.

FIELD OF THE INVENTION

The present invention relates to an improved system for processing, storing, and transporting liquefied natural gas (LNG), and more particularly, to a novel system for processing, storing, and transporting LNG at substantially increased pressures and temperatures over conventional LNG systems.

BACKGROUND OF THE INVENTION

Various terms are defined in the following specification. For convenience, a Glossary of terms is provided herein, immediately preceding the claims.

Many sources of natural gas are located in remote areas, great distances from any commercial markets for the gas. Sometimes a pipeline is available for transporting produced natural gas to a commercial market. When pipeline transportation to a commercial market is not feasible, produced natural gas is often processed into LNG for transport to market. The LNG is typically transported via specially built tankers, and then stored and revaporized at an import terminal near the market. The equipment used to liquefy, transport, store, and revaporize natural gas is generally quite expensive; and a typical conventional LNG project can cost from $5 billion to $10 billion, including field development costs. A typical "grass roots" LNG project requires a minimum natural gas resource of about 280 Gm$^3$ (10 TCF (trillion cubic feet)) and the LNG customers are generally large utilities. Often, natural gas resources discovered in remote areas are smaller than 280 Gm$^3$ (10 TCF). Even for natural gas resource bases that meet the 280 Gm$^3$ (10 TCF) minimum, very long-term commitments of 20 years or more from all involved, i.e., the LNG supplier, the LNG shipper, and the large utility LNG customer, are required to economically process, store, and transport the natural gas as LNG. Where potential LNG customers have an alternative source of gas, such as pipeline gas, the conventional LNG chain of delivery is often not economically competitive.

FIG. 1 illustrates schematically a conventional LNG plant that produces LNG at temperatures of about −162° C. (−260° F.) and at atmospheric pressure. A typical natural gas stream enters a conventional LNG plant at pressures from about 4830 kPa (700 psia) to about 7600 kPa (1100 psia) and temperatures from about 21° C. (70° F.) to about 38° C. (100° F.). Up to about 350,000 refrigeration horsepower are needed to reduce the temperature of the natural gas to the very low outlet temperature of about −162° C. (−260° F.) in a conventional two-train LNG plant. Water, carbon dioxide, sulfur-containing compounds, such as hydrogen sulfide, other acid gases, n-pentane and heavier hydrocarbons, including benzene, must be substantially removed from the natural gas during conventional LNG processing, down to parts-per-million (ppm) levels, or these compounds will freeze, causing plugging problems in the process equipment.

In a conventional LNG plant, gas treating equipment is required to remove the carbon dioxide and acid gases. The gas treating equipment typically uses a chemical and/or physical solvent regenerative process and requires a significant capital investment. Also, the operating expenses are high in relation to those for other equipment in the plant. Dry bed dehydrators, such as molecular sieves, are required to remove the water vapor. The scrub column and fractionation equipment are used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapors in LNG containers at the point of delivery is undesirable.

Containers, piping, and other equipment used in a conventional LNG plant are typically constructed, at least in part, from aluminum or nickel-containing steel (e.g., 9 wt % nickel), to provide the necessary fracture toughness at the extremely cold processing temperatures. Expensive materials with good fracture toughness at low temperatures, including aluminum and commercial nickel-containing steel (e.g., 9 wt % nickel), are typically used to contain the LNG in the LNG ships and at the import terminals, in addition to their use in the conventional plant.

Nickel-containing steels conventionally used for cryogenic temperature structural applications, e.g., steels with nickel contents of greater than about 3 wt %, have low DBTTs (a measure of toughness, as defined herein), but also have relatively low tensile strengths. Typically, commercially available 3.5 wt % Ni, 5.5 wt % Ni, and 9 wt % Ni steels have DBTTs of about −100° C. (−150° F.), −155° C. (−250° F.), and −175° (−280° F.), respectively, and tensile strengths of up to about 485 MPa (70 ksi), 620 MPa (90 ksi), and 830 MPa (120 ksi), respectively. In order to achieve these combinations of strength and toughness, these steels generally undergo costly processing, e.g., double annealing treatment. In the case of cryogenic temperature applications, industry currently uses these commercial nickel-containing steels because of their good toughness at low temperatures, but must design around their relatively low tensile strengths. The designs (generally require excessive steel thicknesses for load-bearing, cryogenic temperature applications. Thus, use of these nickel-containing steels in load-bearing, cryogenic temperature applications tends to be expensive due to the high cost of the steel combined with the steel thicknesses required.

A typical conventional LNG ship utilizes large spherical containers, known as Moss spheres, to store the LNG during transport. These ships currently cost more than about $230 million each. A typical conventional project to produce LNG in the Middle East and transport it to the Far East might require 7 to 8 of these ships for a total cost of about $1.6 billion to $2.0 billion.

As can be determined from the above discussion, the need exists for a more economical system for processing, storing, and transporting LNG to commercial markets to allow remote natural gas resources to compete more effectively with alternative energy supplies. Furthermore, a system is needed to commercialize smaller remote natural gas resources that would otherwise be uneconomical to develop. In addition, a more economical gasification and delivery system is needed so that LNG can be made economically attractive to smaller consumers.

Consequently, the primary objects of the present invention are to provide a more economical system for processing, storing, and transporting LNG from remote sources to commercial markets and to substantially reduce the threshold size of both the reserve and the market required to make an LNG project economically feasible. One way to accomplish these objects would be to process the LNG at higher pressures and temperatures than is done in a conventional LNG plant, i.e., at pressures higher than atmospheric pressure and temperatures higher than −162° C. (−260° F.). While the general concept of processing, storing, and transporting LNG at increased pressures and temperatures has been discussed in industry publications, these publications generally discuss constructing transportation containers from nickel-containing steel (e.g., 9 wt % nickel) or aluminum, both of which may meet design requirements but are very expensive materials. For example, at pp. 162–164 of his book *NATURAL GAS BY SEA The Developement of a New Technology*, published by Witherby & Co. Ltd., first edition 1979, second edition 1993, Roger Ffooks discusses the conversion of the Liberty ship Sigalpha to carry either MLG (medium condition liquefied gas) at 1380 kPa (200 psig) and −115° C. (−175° F.), or CNG (compressed natural gas) processed at 7935 kPa (1150 psig) and −60° C. (−75° F.). Mr. Ffooks indicates that although technically proven, neither of the two concepts found 'buyers'—largely due to the high cost of storage. According to a paper on the subject referenced by Mr. Ffooks, for CNG service, i.e., at −60° C. (−75° F.), the design target was a low alloy, weldable, quenched and tempered steel with good strength (760 MPa (110 ksi)) and good fracture toughness at operating conditions. (See "A new process for the transportation of natural gas" by R. J. Broeker, International LNG Conference, Chicago, 1968.) This paper also indicates that an aluminum alloy was the lowest cost alloy for MLG service, i.e., at tle much lower temperature of −115° C. (−175° F.). Also, Mr. Ffooks discusses, at p. 164, the Ocean Phoenix Transport design, working at a much lower pressure of about 414 kPa (60 psig), with tanks that could be constructed of 9 percent nickel steel or aluminum alloy; and indicates that, again, the concept did not appear to offer sufficient technical or financial advantages to become commercialized. See also: (i) U.S. Pat. No. 3,298,805, which discusses the use of a 9% nickel content steel or a high strength aluminum alloy for making containers for the transport of a compressed natural gas; and (ii) U.S. Pat. No. 4,182,254, which discusses tanks of 9% nickel or similar steel for the transport of LNG at temperatures from −100° C. (−148° F.) to −140° C. (−220° F.) and pressures of 4 to 10 atmospheres (i.e., of 407 kPa (59 psia) to 1014 kPa (147 psia)); (iii) U.S. Pat. No. 3,232,725, which discusses transportation of a natural gas in a dense phase single-fluid state at a temperature as low as −62° C. (−80° F.), or in some cases −68° C. (−90° F.), and at pressures at least 345 kpa (50 psi) above the boiling point pressure of the gas at operating temperatures, using containers constructed from materials such as 1 to 2 percent nickel steel which has been quenched and tempered to secure an ultimate tensile strength approaching 120,000 psi; and (iv) "Marine Transportation of LNG at Intermediate Temperature", CME March 1979, by C. P. Bennett, which discusses a case study of transport of LNG at a pressure of 3.1 MPa (450 psi) and a temperature of −100C. (−140° F.) using a storage tank constructed from a 9% Ni steel or a 3½% Ni quenched and tempered steel and having 9½ inch thick walls.

Although these concepts are discussed in industry publications, to our knowledge, LNG is not currently commercially processed, stored, and transported at pressures substantially higher than atmospheric pressure and temperatures substantially higher than −162° C. (−260° F.). This is likely due to the fact that an economical system for processing, storing, and transporting the LNG at such pressures and temperatures has not heretofore been conceived.

Therefore, a particular object of the present invention is to provide an improved, economical system for processing, storing, and transporting LNG at substantially increased pressures and temperatures over conventional LNG systems.

SUMMARY OF THE INVENTION

Consistent with the above-stated objects of the present invention, a container is provided for storing pressurized liquefied natural gas (PLNG) at a pressure in the broad range of about 1035 kPa (150 psia) to 7590 kPa (1100 psia) and at a temperature in the broad range of about −123° C. (−190° F.) to about −62° C. (−80° F.), said container being constructed from materials comprising an ultra-high strength, low alloy steel containing less than 9 wt % nickel and having adequate strength and fracture toughness to contain said pressurized liquefied natural gas. The steel has an ultra-high strength, e.g., tensile strength (as defined herein) greater than 830 MPa (120 ksi), and a DBTT (as defined herein) lower than about −73° C. (−100° F.). In order to minimize cost, the steel preferably contains less than about 7 wt % nickel, and more preferably less than about 5 wt % nickel. Additionally, a system for processing and transporting PLNG is provided. The system of the present invention produces PLNG at pressures in the broad range of about 1035 kPa (150 psia) to about 7590 kPa (1100 psia) and at temperatures in the broad range of about −123° C. (−190° F.) to about −62° C. (−80° F.), and uses the containers of this invention for storing and transporting the PLNG.

The present invention provides a system for processing natural gas to produce PLNG, for storing PLNG, and for transporting PLNG to a user site. The system of the present invention includes: (i) a processing plant for converting the natural gas to PLNG with a pressure of about 1035 kPa (150 psia) to about 7590 kPa (1100 psia) and a temperature of about −123° C. (−190° F.) to about −62° C. (−80° F.), wherein the processing plant consists essentially of—(a) reception facilities for receiving a natural gas stream and removing liquid hydrocarbons from the natural gas; (b) dehydration facilities for removing sufficient water vapor from the natural gas to prevent freezing of the natural gas at the PLNG temperatures and pressures; and (c) liquefaction facilities for converting the natural gas to PLNG;—(ii) storage containers constructed from materials comprising an ultra-high strength, low alloy steel containing less than 9 wt % nickel and having a tensile strength greater than 830 MPa (120 ksi) and a DBTT lower than about −73° C. (−100° F.); (iii) export terminal (a) including storage containers for storing the PLNG and facilities for transferring the PLNG into transportation storage containers on-board a transportation vessel or, optionally, (b) consisting essentially of facilities for transferring the PLNG into transportation storage containers on-board a transportation vessel; (iv) transportation vessels, including transportation storage containers, for transporting the PLNG to an import terminal, and, optionally, including on-board vaporizing equipment to convert the PLNG to a gas; and (v) import terminal (a) including import storage containers (wherein the import storage containers are land-based, or floating-vessel-based, or offshore-fixed-structure-based), facilities for transferring the PLNG from the transportation storage containers to the import storage containers, and facilities for vaporizing the PLNG for delivery to pipelines or users' facilities, or, optionally, (b) consisting essentially of import facilities (wherein the import facilities are land-based, or floating-vessel-based, or offshore-fixed-structure-based), including vaporizing equipment, for receiving the PLNG from the transportation storage containers and for converting the PLNG to a gas and delivering the gas to pipelines or users' facilities, or, optionally (c) consisting essentially of facilities for transferring the gas converted from PLNG by on-board vaporizing equipment to pipelines or users' facilities at the dock or via offshore mooring connections, such as a single anchor leg mooring (SALM).

DESCRIPTION OF THE DRAWINGS

The advantages of the present invention will be better understood by referring to the following detailed description and the attached drawings in which:

FIG. 4A illustrates an end view of an exemplary ship for transporting PLNG according to the present invention and having an on-board PLNG vaporizer;

FIG. 4B illustrates a side view of an exemplary ship for transporting PLNG according to the present invention and having an on-board PLNG vaporizer;

FIG. 4C illustrates a top view of an exemplary ship for transporting PLNG according to the present invention and having an on-board PLNG vaporizer;

Figure 1:
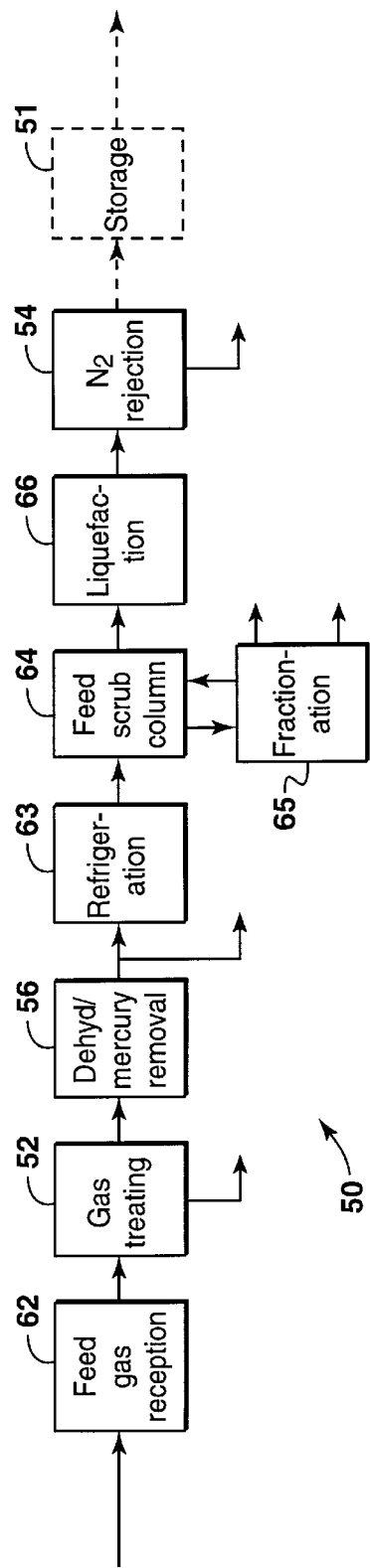
FIG. 1 (PRIOR ART) schematically illustrates an exemplary plant for processing conventional LNG.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

PLNG Storage Containers

The key to achieving the PLNG plant and transportation vessels of the present invention are the storage containers for storing and transporting the PLNG, which is produced at a pressure in the broad range of about 1035 kPa (150 psia) to about 7590 kPa (1100 psia) and at a temperature in the broad range of about −123° C. (−190° F.) to about −62° C. (−80° F.). Storage containers for the PLNG are constructed from materials comprising an ultra-high strength, low alloy steel that has both adequate strength and fracture toughness for the operating conditions of the PLNG system of the present invention, including pressures and temperatures. The steel has a tensile strength greater than 830 MPa (120 ksi), preferably greater than about 860 MPa (125 ksi), and more preferably greater than about 900 MPa (130 ksi). In some applications, a steel having a tensile strength of greater than about 930 MPa (135 ksi), or greater than about 965 MPa (140 ksi), or greater than about 1000 MPa (145 ksi), is preferable. The steel also preferably has a DBTT lower than about −73° C. (−100° F.). Additionally, a container is provided for storing pressurized liquefied natural gas at a pressure of about 1725 kPa (250 psia) to about 4830 kPa (700 psia) and at a temperature of about −112° C. (−170° F.) to about −79° C. (−110° F.), wherein said container (i) is constructed from materials comprising an ultra-high strength, low alloy steel containing less than 9 wt % nickel and (ii) has adequate strength and fracture toughness to contain said pressurized liquefied natural gas.

The ultra-high strength, low alloy steels used for constructing containers according to this inventions preferably contain low quantities of expensive alloys, such as nickel. Preferably the nickel content is less than 9 wt %, more preferably less than about 7 wt %, and even more preferably less than about 5 wt %. More preferably, such steels contain the minimum amount of nickel necessary to provide the required fracture toughness. Preferably such ultra-high strength, low alloy steels contain less than about 3 wt % nickel, more preferably less than about 2 wt % nickel, and even more preferably less than about 1 wt % nickel.

Preferably, such steels are weldable. These ultra-high strength, low alloy steels facilitate the construction of containers to transport the PLNG at a substantially lower cost per pound for the steel than would be possible with currently available alternatives of aluminum or commercial nickel-containing steels (e.g., 9 wt % nickel). Preferably the steel used for constructing storage containers of this invention is not tempered. However, a tempered steel having the necessary strength and fracture toughness may be used for constructing storage containers of this invention.

As will be familiar to those skilled in the art, the Charpy V-notch (CVN) test can be used for the purpose of fracture toughness assessment and fracture control in the design of storage containers for transporting pressurized, cryogenic temperature fluids, such as PLNG, particularly through use of the ductile-to-brittle transition temperature (DBTT). The DBTT delineates two fracture regimes in structural steels. At temperatures below the DBTT, failure in the Charpy V-notch test tends to occur by low energy cleavage (brittle) fracture, while at temperatures above the DBTT, failure tends to occur by high energy ductile fracture. Storage and transportation containers that are constructed from welded steels for the aforementioned cryogenic temperature applications and for other load-bearing, cryogenic temperature service must have DBTTs, as determined by the Charpy V-notch test, well below the service temperature of the structure in order to avoid brittle failure. Depending on the design, the service conditions, and/or the requirements of the applicable classification society, the required DBTT temperature shift may be from 5° C. to 30° C. (9° F. to 54° F.) below the service temperature.

As will be familiar to those skilled in the art, the operating conditions taken into consideration in the design of storage containers constructed from a welded steel for transporting pressurized, cryogenic fluids, include among other things, the operating pressure and temperature, as well as additional stresses that are likely to be imposed on the steel and the weldments (see Glossary). Standard fracture mechanics measurements, such as (i) critical stress intensity factor ($K_{IC}$), which is a measurement of plane-strain fracture toughness, and (ii) crack tip opening displacement (CTOD), which can be used to measure elastic-plastic fracture toughness, both of which are familiar to those skilled in the art, may be used to determine the fracture toughness of the steel and the weldments. Industry codes generally acceptable for steel structure design, for example, as presented in the BSI publication "Guidance on methods for assessing the acceptability of flaws in fusion welded structures", often referred to as "PD 6493:1991", may be used to determine the maximum allowable flaw sizes for the containers based on the fracture toughness of the steel and weldment (including HAZ) and the imposed stresses on the container. A person skilled in the art can develop a fracture control program to mitigate fracture initiation through (i) appropriate container design to minimize imposed stresses, (ii) appropriate manufacturing quality control to minimize defects, (iii) appropriate control of life cycle loads and pressures applied to the container, and (iv) an appropriate inspection program to reliably detect flaws and defects in the container. A preferred design philosophy for the system of the present invention is "leak before failure", as is familiar to those skilled in the art. These considerations are generally referred to herein as "known principles of fracture mechanics."

The following is a none-limiting example of application of these known principles of fracture mechanics in a procedure for calculating critical flaw depth for a given flaw length for use in a fracture control plan to prevent fracture initiation in a pressure vessel, such as a storage container according to this invention.

Figure 5A:
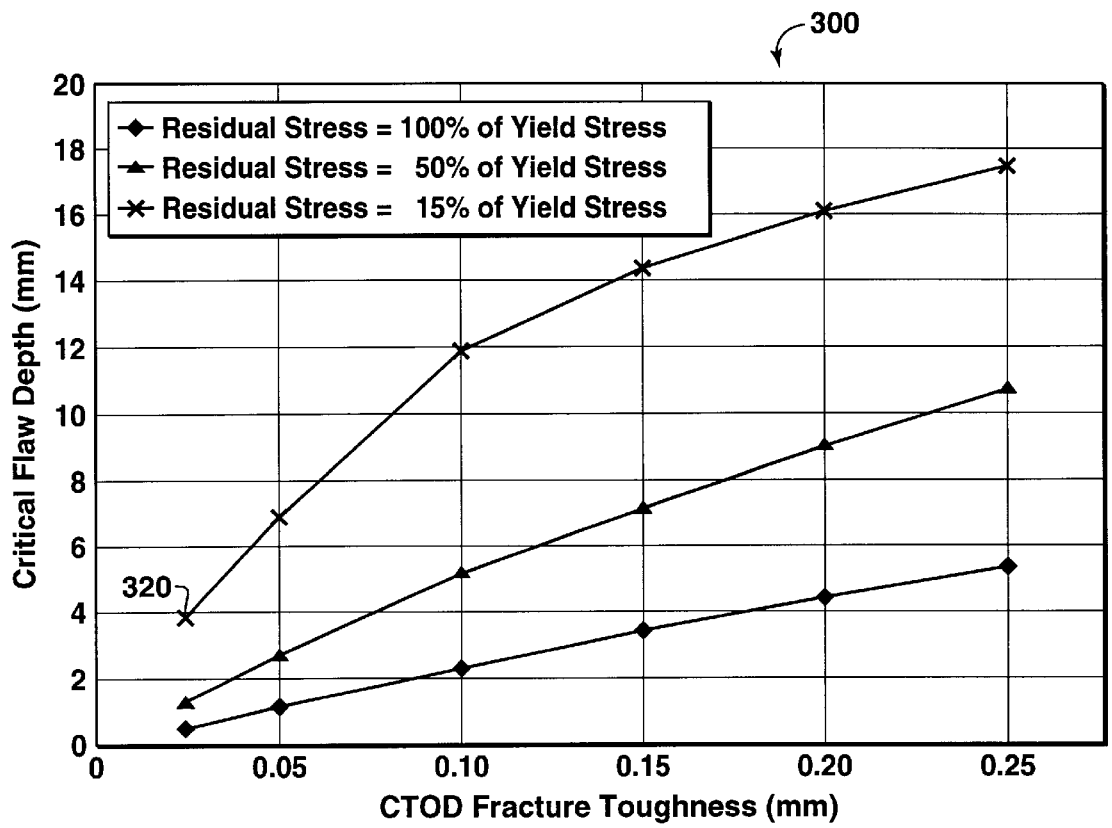
FIG. 5A illustrates a plot of critical flaw depth, for a given flaw length, as a function of CTOD fracture toughness and of residual stress.
Figure 5B:
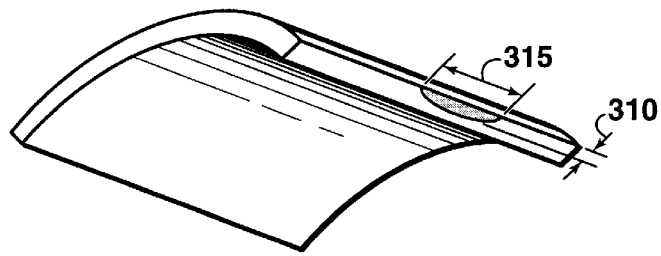
FIG. 5B illustrates the geometry (length and depth) of a flaw.

FIG. 5B illustrates a flaw of flaw length 315 and flaw depth 310. PD6493 is used to calculate values for the critical flaw size plot 300 shown in FIG. 5A based on the following design conditions:

Vessel Diameter: 4.57 m (15 ft)
Vessel Wall Thickness: 25.4 mm (1.00 in.)
Design Pressure: 3445 kPa (500 psi)
Allowable Hoop Stress: 333 MPa (48.3 ksi).

For the purpose of this example, a surface flaw length of 100 mm (4 inches), e.g., an axial flaw located in a seam weld, is assumed. Referring now to FIG. 5A, plot 300 shows the value for critical flaw depth as a function of CTOD fracture toughness and of residual stress, for residual stress levels of 15, 50 and 100 percent of yield stress. Residual stresses can be generated due to fabrication and welding; and PD6493 recommends the use of a residual stress value of 100 percent of yield stress in welds (including the weld HAZ) unless the welds are stress relieved using techniques such as post weld heat treatment (PWHT) or mechanical stress relief.

Based on the CTOD fracture toughness of the pressure vessel steel at the minimum service temperature, the vessel fabrication can be adjusted to reduce the residual stresses and an inspection program can be implemented (for both initial inspection and in-service inspection) to detect and measure flaws for comparison against critical flaw size. In this example, if the steel has a CTOD toughness of 0.025 mm at the minimum service temperature (as measured using laboratory specimens) and the residual stresses are reduced to 15 percent of the steel yield strength, then the value for critical flaw depth is approximately 4 mm (see point 320 on FIG. 5A). Following similar calculation procedures, as are well known to those skilled in the art, critical flaw depths can be determined for various flaw lengths as well as various flaw geometries. Using this information, a quality control program and inspection program (techniques, detectable flaw dimensions, frequency) can be developed to ensure that flaws are detected and remedied prior to reaching the critical flaw depth or prior to the application of the design loads. Based on published empirical correlations between CVN, $K_{IC}$ and CTOD fracture toughness, the 0.025 mm CTOD toughness generally correlates to a CVN value of about 37 J. This example is not intended to limit this invention in any way.

The storage containers are preferably constructed from discrete plates of the ultra-high strength, low alloy steel. The joints, including welded joints, of the storage containers preferably have about the same strength and fracture toughness as the ultra-high strength, low alloy steel plates. In some cases, an undermatching of the strength on the order of about 5% to about 10% may be justified for locations of lower stress within the container. Joints with the preferred properties can be made by any joining technique capable of producing the required balance of strength and low temperature toughness. Exemplary joining techniques are described in the Examples section hereof. Particularly preferred joining techniques include gas metal arc welding (GMAW) and tungsten inert gas (TIG) welding. For certain operating conditions (as described in the Example section hereof) submerged arc welding (SAW), electron beam welding (EBW), and laser beam welding (LBW) may be used.

PLNG Plant

The storage containers described above make feasible the PLNG processing method of the present invention, which produces PLNG at a pressure in the broad range of about 1035 kPa (150 psia) to about 7590 kPa (1100 psia) and at a temperature in the range of about −123° C. (−190° F.) to about −62° C. (−80° F.). Preferably, PLNG is produced and transported at a pressure in the range of about 1725 kPa (250 psia) to about 7590 kPa (1100 psia) and at a temperature in the range of about −112° C. (−170° F.) to about −62° C. (−80° F.). More preferably, PLNG is produced and transported at a pressure in the range of about 2415 kPa (350 psia) to about 4830 kPa (700 psia) and at a temperature in the range of about −101° C. (−150° F.) to about −79° C. (−110° F.). Even more preferably, the lower ends of the pressure and temperature ranges for PLNG are about 2760 kPa (400 psia) and about −96° C. (−140° F.). Within the preferred ranges, ideal temperature and pressure combinations are dependent upon the composition of the natural gas being liquefied and upon economic considerations. A person skilled in the art may determine the effect of compositional parameters by referring to standard industry publications and/or performing equilibrium bubble point calculations. Additionally, a person skilled in the art may determine and analyze the impact of the different economic considerations by referring to standard industry publications. For example, one economic consideration is that as the temperature of the PLNG gets colder, refrigeration horsepower requirements increase; however, colder temperatures at the increased pressures for PLNG also increase the density of the PLNG and, thereby, reduce the volume that must be transported. As the temperature of the PLNG gets warmer, and the pressure increases, more steel is required in storage and transport containers, but the refrigeration costs decrease and the plant efficiency increases.

Figure 2:
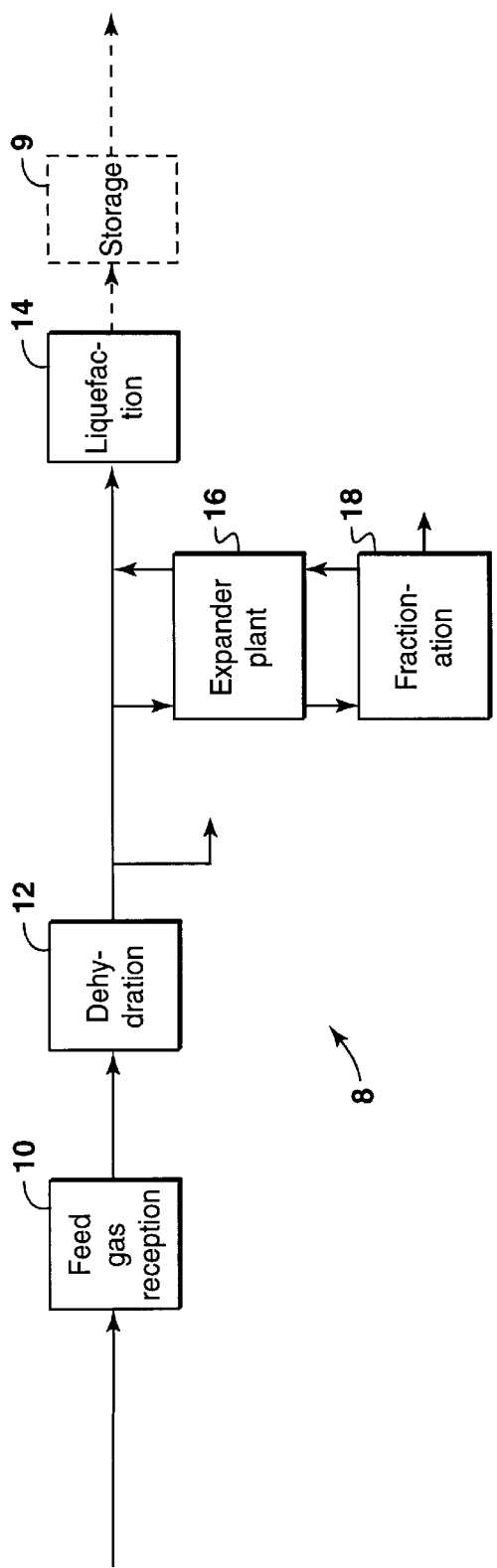
FIG. 2 schematically illustrates an exemplary plant for processing PLNG according to the present invention.

The following description focuses primarily on the economically advantageous differences of a system of the present invention as compared to a conventional system or processing LNG. FIG. 2 illustrates schematically an exemplary plant for processing PLNG according to the present invention. For comparison purposes, FIG. 1 illustrates schematically an exemplary plant for processing conventional LNG. As shown in FIG. 1, an exemplary plant for processing conventional LNG includes feed gas reception equipment 62, gas treating equipment 52, dehydration/mercury removal equipment 56, refrigeration equipment 63, feed scrub equipment 64, fractionation equipment 65, liquefaction equipment 66, and nitrogen rejection equipment 54. While standard natural gas liquefaction equipment can be satisfactorily utilized in a processing plant for the present invention, several steps required in a conventional LNG plant can be eliminated, and energy needed for cooling the natural gas is greatly reduced. Thus, in the PLNG process, natural gas that would be consumed for providing energy in the conventional LNG process can be converted to marketable PLNG. Referring to FIG. 2, the PLNG processing steps preferably include (i) feed gas reception facilities 10 for removing liquid hydrocarbons, (ii) dehydration facilities 12, and (iii) liquefaction facilities 14. An expander plant 16 and fractionation train 18 can be used to produce make-up refrigerants for use in the liquefaction facilities 14. Alternatively either part or all of the refrigerants needed for the liquefaction 14 can be purchased and/or supplied from some other source. Well-known refrigeration processes can be used to achieve the desired low temperature of the PLNG. Such processes may include, for example, a single refrigerant, a multicomponent refrigerant, a cascade refrigeration cycle or combinations of these cycles. Additionally, expansion turbines may be used in the refrigeration process. Compared to a conventional LNG plant, the very large reduction of necessary refrigeration horsepower in a PLNG plant according to the present invention results in a large reduction in capital costs, proportionately lower operating expenses, and increased efficiency and reliability, thus greatly enhancing the economics of producing liquefied natural gas.

A plant for producing PLNG according to the present invention compares to a conventional LNG process as follows. Referring to FIG. 1 and FIG. 2, since the liquefaction temperatures in the PLNG plant 8 (FIG. 2) are higher than in a conventional LNG plant 50 (FIG. 1) (that produces conventional LNG at about −162° C. (−260° F.) and atmospheric pressure), the gas treating equipment 52 (FIG. 1) for removal of freezable components such as carbon dioxide, n-pentane plus, and benzene, which are required in the conventional LNG plant 50, are generally not required in the PLNG plant 8 because these naturally occurring components will not normally freeze and cause plugging problems in the PLNG plant equipment due to the warmer operating temperatures. If unusually high amounts of carbon dioxide, sulfur-containing compounds, n-pentane plus, or benzene are present in a natural gas being processed by a PLNG plant 8, some gas treating equipment for removal thereof may be added as needed. Additionally, nitrogen must be removed in the conventional LNG plant 50 (in the nitrogen rejection facility 54) because nitrogen will not remain in the liquid phase during transport of conventional LNG, which is at atmospheric pressure. Moderate amounts of nitrogen in the inlet gas need not be removed in the PLNG plant 8 because nitrogen will remain in the liquid phase with the liquefied hydrocarbons at the operating pressures and temperatures of the PLNG process. Additionally, mercury is removed in a conventional LNG plant 50 (in mercury removal equipment 56). Since the PLNG plant 8 operates at much warmer temperatures than a conventional LNG plant 50 and, therefore, aluminum materials need not be used in the containers, piping, and other equipment of the PLNG plant 8, mercury removal equipment will generally not be required in the PLNG plant 8. The ability to omit the equipment required for gas treating, nitrogen rejection, and mercury removal when the composition of the natural gas allows, provides significant technical and economic advantage.

At the preferred operating pressures and temperatures of the present invention, about 3½ wt % nickel steel can be used in the coldest operating areas of the PLNG plant 8 for the process piping and facilities, whereas the more expensive 9 wt % nickel steel or aluminum is generally required for the same equipment in a conventional LNG plant 50. This provides another significant cost reduction for the PLNG plant 8 compared to the conventional LNG plant. Preferably, high strength, low alloy steels with adequate strength and fracture toughness at the operating conditions of the PLNG plant 8, are used to construct the piping and associated components (e.g., flanges, valves, and fittings), pressure vessels, and other equipment of the PLNG plant 8 in order to provide further economic advantage over a conventional LNG plant.

Referring again to FIG. 1, LNG produced in a conventional LNG plant 50 is stored in one or more storage containers 51 at a nearby export terminal. Referring now to FIG. 2, PLNG produced in a PLNG plant 8 may be stored in one or more storage containers 9, constructed of an ultra-high strength, low alloy steel according to this invention, at a nearby export terminal. In another embodiment of this invention, PLNG produced in a PLNG plant 8 may be transferred to one or more transportation storage containers 9, constructed of an ultra-high strength, low alloy steel according to this invention, on a PLNG transportation vessel, as further described below.

A PLNG plant, according to this invention, can be used as a peak shaving plant to allow storage of natural gas as PLNG. For example, a conventional LNG import terminal receives LNG by ship, stores the LNG, and vaporizes the LNG for delivery to a gas distribution grid. Stored LNG generates vapors ("boiloff") as it warms. Usually, the boiloff is withdrawn from the LNG storage container and delivered to the gas distribution grid with the vaporized LNG. During periods of low gas demand, the boiloff can exceed the volume of vapors required for delivery to the grid. In such instances, the boiloff is generally reliquefied and stored as LNG until needed during periods of high demand. Using the present invention, the boiloff can be reliquefied to PLNG and stored until needed during periods of high demand. In another example, a company that provides gas to consumers for home or business heating typically obtains extra natural gas for distribution to consumers during periods of peak demand by vaporizing LNG. Using the present invention, the company can obtain extra natural gas for distribution to consumers during periods of peak demand by vaporizing PLNG. Use of PLNG in peak shaving plants, rather than LNG, can be more economical.

PLNG Transportation Vessels

Figure 3A:
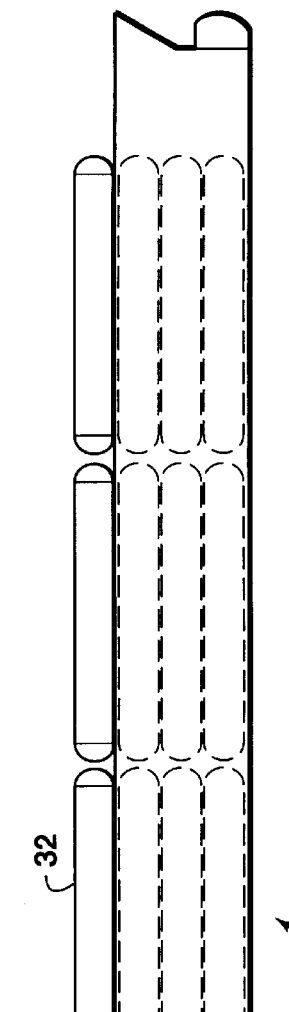
FIG. 3A illustrates an end view of an exemplary ship for transporting PLNG according to the present invention.
Figure 3B:
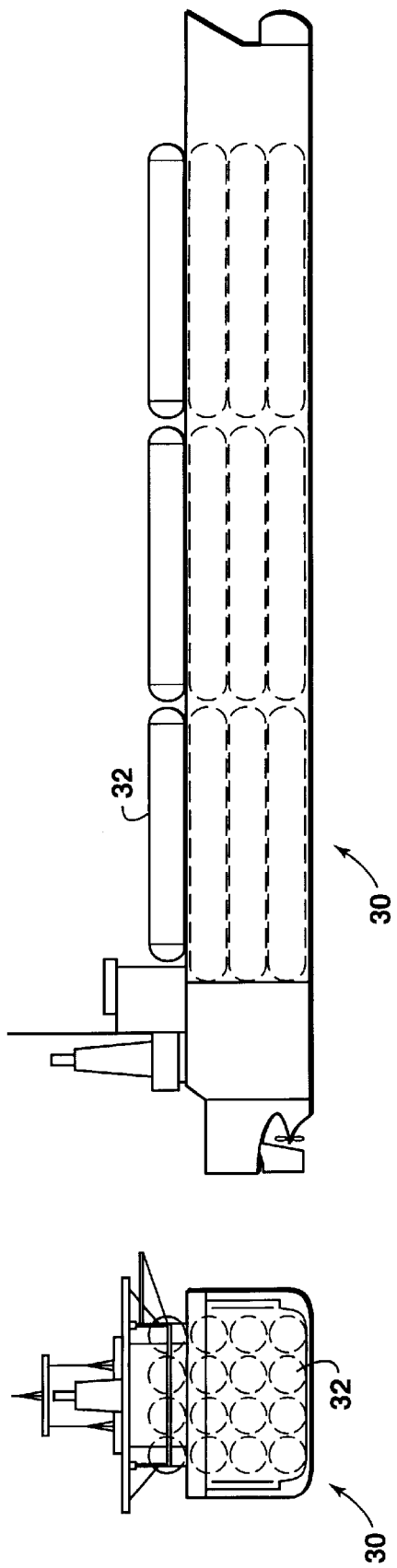
FIG. 3B illustrates a side view of an exemplary ship for transporting PLNG according to the present invention.
Figure 3C:
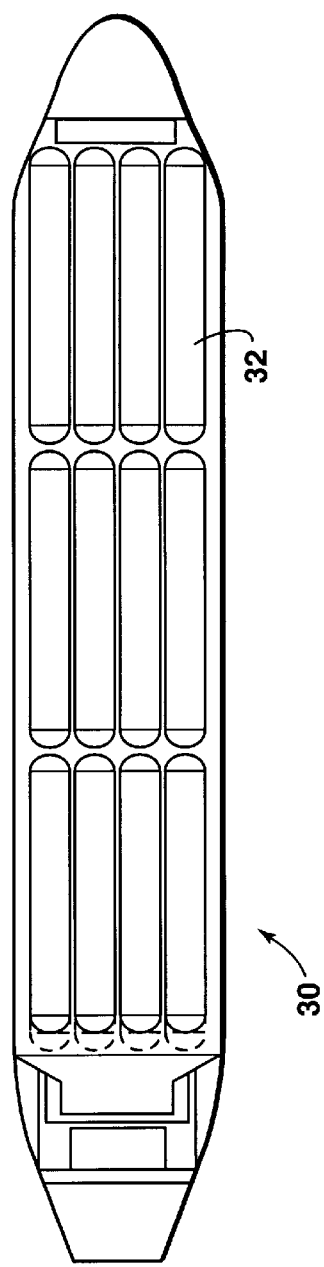
FIG. 3C illustrates a top view of an exemplary ship for transporting PLNG according to the present invention.

The PLNG transportation vessels of the present invention contain storage containers constructed from ultra-high strength, low alloy steels as described above. The PLNG transportation vessels are preferably marine vessels, e.g., ships, which are propelled across a body of water from a PLNG export terminal to a PLNG import terminal. The PLNG product has a density that is less than the density of conventional LNG. Typically, the PLNG product density is about 75% (or less) of the density of conventional LNG. Thus, a fleet of ships with a total volume carrying capacity of about 125% or more than that of a fleet for a conventional project to transport conventional LNG is desired for the system of the present invention to carry the increased production from a more efficient plant as well as the increased volume due to lower density. FIGS. 3A, 3B, and 3C illustrate an exemplary high capacity ship designed to carry PLNG. This exemplary PLNG ship 30 holds forty-eight storage containers 32 cylindrical in shape with hemispherical or ellipsoidal heads. The containers can also be spherical in shape. The number and dimensions of the containers are dependent upon actual tensile strength of the ultra-high strength, low alloy steel, the wall thickness of the containers, and the design pressure, as is familiar to those skilled in the art.

PLNG ships are estimated to cost less than conventional LNG ships and have significantly more carrying capacity than the largest ships currently carrying conventional LNG. In a preferred embodiment of the present invention, the containers hold PLNG at temperatures from about −101° C. (−150° F.) to about −79° C. (−110° F.), and this requires some form of insulation. Currently commercially available industrial insulating materials with good low temperature insulating properties can be used.

The PLNG ship design offers flexibility in alternatives to meet customers' needs and minimize costs, as more fully described below in the discussion of import terminals. The ship can be designed for a specific capacity by adding or deleting PLNG containers. It can be designed to load/unload PLNG in a short period of time (typically 12 hours) or load/unload at slower rates up to plant production rates. If the customer desires to reduce its import costs to a minimum, the PLNG ship can be designed to include on-board vaporization equipment to deliver gas directly to the customer, as illustrated by FIGS. 4A, 4B, and 4C. The exemplary PLNG ship 40 holds forty-four storage containers 42 and on-board vaporization equipment 44.

The PLNG ship offers a number of advantages over a conventional LNG ship. Such advantages include substantially larger carrying capacity, a lower cost, the ability to more easily tailor carrying capacity to meet customers' needs, the ability to deliver PLNG in liquid form or to vaporize PLNG on-board to a gas for delivery, lower pumping costs since PLNG is at a higher pressure (about 2415 kPa (350 psia) to about 4830 kPa (700 psia) at the preferred conditions) as compared to atmospheric pressure (about 100 kPa (14.7 psia)) for conventional LNG, and shorter construction time since the storage containers and associated piping can be pre-fabricated and lifted into place, thus minimizing labor required on-board the ship.

PLNG Export and Import Terminals

The PLNG export terminal can include a dock, storage tanks, and shipping pumps. The PLNG import terminal can include a dock, storage tanks, shipping pumps, and vaporizing equipment. PLNG storage containers at the export terminal and import terminal are preferably constructed from ultra-high strength, low alloy steels that have adequate strength and fracture toughness for the operating conditions of the PLNG system of the present invention, including pressures and temperatures.

Alternatively, storage tanks can be eliminated at the PLNG export terminal and/or PLNG import terminal. In a PLNG system with no storage tanks at the export terminal, produced PLNG is transferred directly from the PLNG plant to transportation storage vessels on-board a PLNG transportation vessel. In a PLNG system with no storage tanks at the import terminal, the import terminal consists essentially of vaporization equipment or, alternatively, each transportation vessel in the PLNG fleet has standard vaporization equipment on-board to directly convert the PLNG to pipeline quality gas. For the case where neither the PLNG export terminal nor the PLNG import terminal have storage containers, for example, two PLNG transportation vessels are added to the fleet of PLNG transportation vessels over the number that would typically be required to transport and deliver the PLNG to market using export and import terminals. Thus, while the other PLNG transportation vessels are in transit, one of the additional PLNG transportation vessels is moored at the export terminal, either being filled with or storing the PLNG, and the other additional PLNG transportation vessels is moored at the import terminal delivering PLNG directly to market. In the case of vaporizers on the transportation vessels, such mooring can be offshore, such as a single anchor leg mooring (SALM). These alternatives are economically advantageous over conventional LNG systems and can substantially reduce the cost of export and import terminals.

EXAMPLES

Example PLNG Storage Containers

As discussed above, containers for storing and transporting PLNG according to the present invention are preferably constructed from ultra-high strength, low alloy steel plates containing less than 9 wt % nickel and having a tensile strength greater than 830 MPa (120 ksi). Any such ultra-high strength, low alloy steel having adequate toughness for containing PLNG at operating conditions, according to the known principles of fracture mechanics as explained above, may be used for constructing the containers for storing and transporting PLNG of this invention. Preferably, such steel has a DBTT lower than about −73° C. (−100° F.).

Recent advances in steel making technology have made possible the manufacture of new, ultra-high strength, low alloy steels with excellent cryogenic temperature toughness. For example, three U.S. patents issued to Koo et al., U.S. Pat. Nos. 5,531,842, 5,545,269, and 5,545,270, describe new steels and methods for processing these steels to produce steel plates with tensile strengths of about 830 MPa (120 ksi), 965 MPa (140 ksi), and higher. The steels and processing methods described therein have been improved and modified to provide combined steel chemistries and processing for manufacturing ultra-high strength, low alloy steels with excellent cryogenic temperature toughness in both the base steel and in the heat affected zone (HAZ) when welded. These ultra-high strength, low alloy steels also have improved toughness over standard commercially available ultra-high strength, low alloy steels. The improved steels are described in a co-pending U.S. patent application entitled "ULTRA-HIGH STRENGTH STEELS WITH EXCELLENT CRYOGENIC TEMPERATURE TOUGHNESS", which has a priority date of Dec. 19, 1997 and is identified by the United States Pat. No. and Trademark Office ("USPTO") as application Ser. No. 09/099649 and has been published in WO 99/32672; in a co-pending U.S. patent application entitled "ULTRA-HIGH STRENGTH AUSAGED STEELS WITH EXCELLENT CRYOGENIC TEMPERATURE TOUGHNESS", which has a priority date of Dec. 19, 1997 and is identified by the USPTO as application Ser. No. 09/099153 and has been published in WO 99/32670 and in a co-pending U.S. patent application entitled "ULTRA-HIGH STRENGTH DUAL PHASE STEELS WITH EXCELLENT CRYOGENIC TEMPERATURE TOUGHNESS", which has a priority date of Dec. 19, 1997 and is identified by the USPTO as application Ser. No. 09/099152 and has been published in WO 99/22671. (collectively, the "Steel Pat. No. Applications").

The new steels described in the Steel Pat. No. Applications, and further described in the examples below, are especially suitable for constructing the containers for storing and transporting PLNG of this invention in that the steels have the following characteristics, preferably for steel plate thicknesses of about 2.5 cm (1 inch) and greater: (i) DBTT lower than about −73° C. (−100° F.), preferably lower than about −107° C. (−160° F.), in the base steel and in the weld HAZ; (ii) tensile strength greater than 830 MPa (120 ksi), preferably greater than about 860 MPa (125 ksi), and more preferably greater than about 900 MPa (130 ksi); (iii) superior weldability; (iv) substantially uniform through-thickness microstructure and properties; and (v) improved toughness over standard, commercially available, ultra-high strength, low alloy steels. Even more preferably, these steels have a tensile strength of greater than about 930 MPa (135 ksi), or greater than about 965 MPa (140 ksi), or greater than about 1000 MPa (145 ksi).

First Steel Example

As discussed above, a copending U.S. patent application, having a priority date of Dec. 19, 1997, entitled "Ultra-High Strength Steels With Excellent Cryogenic Temperature Toughness", and identified by the USPTO as Application Ser. No. 09/099649, provides a description of steels suitable for use in the present invention. A method is provided for preparing an ultra-high strength steel plate having a microstructure comprising predominantly tempered fine-grained lath martensite, tempered fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature below about the $M_s$ transformation temperature plus 200° C. (360° F.); (e) stopping the quenching; and (f) tempering the steel plate at a tempering temperature from about 400° C. (752° F.) up to about the $Ac_1$ transformation temperature, preferably up to, but not including, the $Ac_1$ transformation temperature, for a period of time sufficient to cause precipitation of hardening particles, i.e., one or more of ε-copper, $Mo_2C$, or the carbides and carbonitrides of niobium and vanadium. The period of time sufficient to cause precipitation of hardening particles depends primarily on the thickness of the steel plate, the chemistry of the steel plate, and the tempering temperature, and can be determined by one skilled in the art. (See Glossary for definitions of predominantly, of hardening particles, of $T_{nr}$ temperature, of $Ar_3$, $M_s$, and $Ac_1$ transformation temperatures, and of $Mo_2C$.).

To ensure ambient and cryogenic temperature toughness, steels according to this first steel example preferably have a microstructure comprised of predominantly tempered fine-grained lower bainite, tempered fine-grained lath martensite, or mixtures thereof. It is preferable to substantially minimize the formation of embrittling constituents such as upper bainite, twinned martensite and MA. As used in this first steel example, and in the claims, "predominantly" means at least about 50 volume percent. More preferably, the microstructure comprises at least about 60 volume percent to about 80 volume percent tempered fine-grained lower bainite, tempered fine-grained lath martensite, or mixtures thereof. Even more preferably, the microstructure comprises at least about 90 volume percent tempered fine-grained lower bainite, tempered fine-grained lath martensite, or mixtures thereof. Most preferably, the microstructure comprises substantially 100% tempered fine-grained lath martensite.

A steel slab processed according to this first steel example is manufactured in a customary fashion and, in one embodiment, comprises iron and the following alloying elements, preferably in the weight ranges indicated in the following Table I:

TABLE I

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.5, more preferably 0.5–1.0 |
| molybdenum (Mo) | 0.1–0.8, more preferably 0.2–0.5 |
| niobium (Nb) | 0.02–0.1, more preferably 0.03–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Vanadium (V) is sometimes added to the steel, preferably up to about 0.10 wt %, and more preferably about 0.02 wt % to about 0.05 wt %.

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this first steel example is prepared by forming a slab of the desired composition as described herein; heating the slab to a temperature of from about 955° C. to about 1065° C. (1750° F. –1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST (as defined in the Glossary) below about the $M_s$ transformation temperature plus 200° C. (360° F.), at which time the quenching is terminated. In one embodiment of this first steel example, the steel plate is then air cooled to ambient temperature. This processing is used to produce a microstructure preferably comprising predominantly fine-grained lath martensite, fine-grained lower bainite, or mixtures thereof, or, more preferably comprising substantially 100% fine-grained lath martensite.

The thus direct quenched martensite in steels according to this first steel example has high strength but its toughness can be improved by tempering at a suitable temperature from above about 400° C. (752° F.) up to about the $Ac_1$ transformation temperature. Tempering of steel within this temperature range also leads to reduction of the quenching stresses which in turn leads to enhanced toughness. While tempering can enhance the toughness of the steel, it normally leads to substantial loss of strength. In the present invention, the usual strength loss from tempering is offset by inducing precipitate dispersion hardening. Dispersion hardening from fine copper precipitates and mixed carbides and/or carbonitrides are utilized to optimize strength and toughness during the tempering of the martensitic structure. The unique chemistry of the steels of this first steel example allows for tempering within the broad range of about 400° C. to about 650° C. (750° F.–1200° F.) without any significant loss of the as-quenched strength. The steel plate is preferably tempered at a tempering temperature from above about 400° C. (752° F.) to below the $Ac_1$ transformation temperature for a period of time sufficient to cause precipitation of hardening particles (as defined herein). This processing facilitates transformation of the microstructure of the steel plate to predominantly tempered fine-grained lath martensite, tempered fine-grained lower bainite, or mixtures thereof. Again, the period of time sufficient to cause precipitation of hardening particles depends primarily on the thickness of the steel plate, the chemistry of the steel plate, and the tempering temperature, and can be determined by one skilled in the art.

Second Steel Example

As discussed above, a copending U.S. patent application, having a priority date of Dec. 19, 1997, entitled "Ultra-High Strength Ausaged Steels With Excellent Cryogenic Temperature Toughness", and identified by the USPTO as Application Ser. No. 09/099153, provides a description of other steels suitable for use in the present invention. A method is provided for preparing an ultra-high strength steel plate having a micro-laminate microstructure comprising about 2 vol % to about 10 vol % austenite film layers and about 90 vol % to about 98 vol % laths of predominantly fine-grained martensite and fine-grained lower bainite, said method comprising the steps of: (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) quenching the steel plate at a cooling rate of about 10° C. per second to about 40° C. per second (18° F./sec–72° F./sec) to a Quench Stop Temperature (QST) below about the $M_s$ transformation temperature plus 100° C. (180° F.) and above about the $M_s$ transformation temperature; and (e) stopping said quenching. In one embodiment, the method of this second steel example further comprises the step of allowing the steel plate to air cool to ambient temperature from the QST. In another embodiment, the method of this second steel example further comprises the step of holding the steel plate substantially isothermally at the QST for up to about 5 minutes prior to allowing the steel plate to air cool to ambient temperature. In yet another embodiment, the method of this second steel example further comprises the step of slow-cooling the steel plate from the QST at a rate lower than about 1.0° C. per second (1.8° F./sec) for up to about 5 minutes prior to allowing the steel plate to air cool to ambient temperature. In yet another embodiment, the method of this invention further comprises the step of slow-cooling the steel plate from the QST at a rate lower than about 1.0° C. per second (1.8° F./sec) for up to about 5 minutes prior to allowing the steel plate to air cool to ambient temperature. This processing facilitates transformation of the microstructure of the steel plate to about 2 vol % to about 10 vol % of austenite film layers and about 90 vol % to about 98 vol % laths of predominantly fine-grained martensite and fine-grained lower bainite. (See Glossary for definitions of $T_{nr}$ temperature and $Ar_3$ and $M_s$ transformation temperatures.)

To ensure ambient and cryogenic temperature toughness, the laths in the micro-laminate microstructure preferably comprise predominantly lower bainite or martensite. It is preferable to substantially minimize the formation of embrittling constituents such as upper bainite, twinned martensite and MA. As used in this second steel example, and in the claims, "predominantly" means at least about 50 volume percent. The remainder of the microstructure can comprise additional fine-grained lower bainite, additional fine-grained lath martensite, or ferrite. More preferably, the microstructure comprises at least about 60 volume percent to about 80 volume percent lower bainite or lath martensite. Even more preferably, the microstructure comprises at least about 90 volume percent lower bainite or lath martensite.

A steel slab processed according to this second steel example is manufactured in a customary fashion and, in one embodiment, comprises iron and the following alloying elements, preferably in the weight ranges indicated in the following Table II:

TABLE II

| Alloying Element | Range (wt %) |
| --- | --- |
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| copper (Cu) | 0.1–1.0, more preferably 0.2–0.5 |
| molybdenum (Mo) | 0.1–0.8, more preferably 0.2–0.4 |
| niobium (Nb) | 0.02–0.1, more preferably 0.02–0.05 |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this second steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of about 10° C. per second to about 40° C. per second (18° F./sec–72° F./sec) to a suitable QST below about the $M_s$ transformation temperature plus 100° C. (180° F.) and above about the $M_s$ transformation temperature, at which time the quenching is terminated. In one embodiment of this second steel example, after quenching is terminated the steel plate is allowed to air cool to ambient temperature from the QST. In another embodiment of this second steel example, after quenching is terminated the steel plate is held substantially isothermally at the QST for a period of time, preferably up to about 5 minutes, and then air cooled to ambient temperature. In yet another embodiment, the steel plate is slow-cooled at a rate slower than that of air cooling, i.e., at a rate lower than about 1° C. per second (1.8° F./sec), preferably for up to about 5 minutes. In yet another embodiment, the steel plate is slow-cooled from the QST at a rate slower than that of air cooling, i.e., at a rate lower than about 1° C. per second (1.8° F./sec), preferably for up to about 5 minutes. In at least one embodiment of this second steel example, the $M_s$ transformation temperature is about 350° C. (662° F.) and, therefore, the $M_s$ transformation temperature plus 100° C. (180° F.) is about 450° C. (842° F.).

The steel plate may be held substantially isothermally at the QST by any suitable means, as are known to those skilled in the art, such as by placing a thermal blanket over the steel plate. The steel plate may be slow-cooled after quenching is terminated by any suitable means, as are known to those skilled in the art, such as by placing an insulating blanket over the steel plate.

Third Steel Example

As discussed above, a copending U.S. patent application, having a priority date of Dec. 19, 1997, entitled "Ultra-High Strength Dual Phase Steels With Excellent Cryogenic Temperature Toughness", and identified by the USPTO as application Ser. No. 09/099152, provides a description of other steels suitable for use in the present invention. A method is provided for preparing an ultra-high strength, dual phase steel plate having a microstructure comprising about 10 vol % to about 40 vol % of a first phase of substantially 100 vol % (i.e., substantially pure or "essentially pure") ferrite and about 60 vol % to about 90 vol % of a second phase of predominantly fine-grained lath martensite, fine-grained lower bainite, or mixtures thereof, wherein the method comprises the steps of (a) heating a steel slab to a reheating temperature sufficiently high to (i) substantially homogenize the steel slab, (ii) dissolve substantially all carbides and carbonitrides of niobium and vanadium in the steel slab, and (iii) establish fine initial austenite grains in the steel slab; (b) reducing the steel slab to form steel plate in one or more hot rolling passes in a first temperature range in which austenite recrystallizes; (c) further reducing the steel plate in one or more hot rolling passes in a second temperature range below about the $T_{nr}$ temperature and above about the $Ar_3$ transformation temperature; (d) further reducing said steel plate in one or more hot rolling passes in a third temperature range below about the $Ar_3$ transformation temperature and above about the $Ar_1$ transformation temperature (i.e., the intercritical temperature range); (e) quenching said steel plate at a cooling rate of about 10° C. per second to about 40° C. per second (18° F./sec–72° F./sec) to a Quench Stop Temperature (QST) preferably below about the $M_s$ transformation temperature plus 200° C. (360° F.); and (f) stopping said quenching. In another embodiment of this third steel example, the QST is preferably below about the $M_s$ transformation temperature plus 100° C. (180° F.), and is more preferably below about 350° C. (662° F.). In one embodiment of this third steel example, the steel plate is allowed to air cool to ambient temperature after step (f). This processing facilitates transformation of the microstructure of the steel plate to about 10 vol % to about 40 vol % of a first phase of ferrite and about 60 vol % to about 90 vol % of a second phase of predominantly fine-grained lath martensite, fine-grained lower bainite, or mixtures thereof. (See Glossary for definitions of $T_{nr}$ temperature, and of $Ar_3$ and $Ar_1$ transformation temperatures.)

To ensure ambient and cryogenic temperature toughness, the microstructure of the second phase in steels of this third steel example comprises predominantly fine-grained lower bainite, fine-grained lath martensite, or mixtures thereof. It is preferable to substantially minimize the formation of embrittling constituents such as upper bainite, twinned martensite and MA in the second phase. As used in this third steel example, and in the claims, "predominantly" means at least about 50 volume percent. The remainder of the second phase microstructure can comprise additional fine-grained lower bainite, additional fine-grained lath martensite, or ferrite. More preferably, the microstructure of the second phase comprises at least about 60 volume percent to about 80 volume percent fine-grained lower bainite, fine-grained lath martensite, or mixtures thereof. Even more preferably, the microstructure of the second phase comprises at least about 90 volume percent fine-grained lower bainite, fine-grained lath martensite, or mixtures thereof.

A steel slab processed according to this third steel example is manufactured in a customary fashion and, in one embodiment, comprises iron and the following alloying elements, preferably in the weight ranges indicated in the following Table III:

TABLE III

| Alloying Element | Range (wt %) |
|---|---|
| carbon (C) | 0.04–0.12, more preferably 0.04–0.07 |
| manganese (Mn) | 0.5–2.5, more preferably 1.0–1.8 |
| nickel (Ni) | 1.0–3.0, more preferably 1.5–2.5 |
| niobium (Nb) | 0.02–0.1, more preferably 0.02–0.05 |

TABLE III-continued

| Alloying Element | Range (wt %) |
| --- | --- |
| titanium (Ti) | 0.008–0.03, more preferably 0.01–0.02 |
| aluminum (Al) | 0.001–0.05, more preferably 0.005–0.03 |
| nitrogen (N) | 0.002–0.005, more preferably 0.002–0.003 |

Chromium (Cr) is sometimes added to the steel, preferably up to about 1.0 wt %, and more preferably about 0.2 wt % to about 0.6 wt %.

Molybdenum (Mo) is sometimes added to the steel, preferably up to about 0.8 wt %, and more preferably about 0.1 wt % to about 0.3 wt %.

Silicon (Si) is sometimes added to the steel, preferably up to about 0.5 wt %, more preferably about 0.01 wt % to about 0.5 wt %, and even more preferably about 0.05 wt % to about 0.1 wt %.

Copper (Cu), preferably in the range of about 0.1 wt % to about 1.0 wt %, more preferably in the range of about 0.2 wt % to about 0.4 wt %, is sometimes added to the steel.

Boron (B) is sometimes added to the steel, preferably up to about 0.0020 wt %, and more preferably about 0.0006 wt % to about 0.0010 wt %.

The steel preferably contains at least about 1 wt % nickel. Nickel content of the steel can be increased above about 3 wt % if desired to enhance performance after welding. Each 1 wt % addition of nickel is expected to lower the DBTT of the steel by about 10° C. (18° F.). Nickel content is preferably less than 9 wt %, more preferably less than about 6 wt %. Nickel content is preferably minimized in order to minimize cost of the steel. If nickel content is increased above about 3 wt %, manganese content can be decreased below about 0.5 wt % down to 0.0 wt %. Therefore, in a broad sense, up to about 2.5 wt % manganese is preferred.

Additionally, residuals are preferably substantially minimized in the steel. Phosphorous (P) content is preferably less than about 0.01 wt %. Sulfur (S) content is preferably less than about 0.004 wt %. Oxygen (O) content is preferably less than about 0.002 wt %.

In somewhat greater detail, a steel according to this third steel example is prepared by forming a slab of the desired composition as described herein; heating the slab to a temperature of from about 955° C. to about 1065° C. (1750° F.–1950° F.); hot rolling the slab to form steel plate in one or more passes providing about 30 percent to about 70 percent reduction in a first temperature range in which austenite recrystallizes, i.e., above about the $T_{nr}$ temperature, further hot rolling the steel plate in one or more passes providing about 40 percent to about 80 percent reduction in a second temperature range below about the $T_{nr}$ temperature and above about the $Ar_3$ transformation temperature, and finish rolling the steel plate in one or more passes to provide about 15 percent to about 50 percent reduction in the intercritical temperature range below about the $Ar_3$ transformation temperature and above about the $Ar_1$ transformation temperature. The hot rolled steel plate is then quenched at a cooling rate of about 10° C. per second to about 40° C. per second (18° F./sec–72° F./sec) to a suitable Quench Stop Temperature (QST) preferably below about the $M_s$ transformation temperature plus 200° C. (360° F.), at which time the quenching is terminated. In another embodiment of this invention, the QST is preferably below about the $M_s$ transformation temperature plus 100° C. (180° F.), and is more preferably below about 350° C. (662° F.). In one embodiment of this third steel example, the steel plate is allowed to air cool to ambient temperature after quenching is terminated.

In the three example steels above, since Ni is an expensive alloying element, the Ni content of the steel is preferably less than about 3.0 wt %, more preferably less than about 2.5 wt %, more preferably less than about 2.0 wt %, and even more preferably less than about 1.8 wt %, to substantially minimize cost of the steel.

Other suitable steels for use in connection with the present invention are described in other publications that describe ultra-high strength, low alloy steels containing less than about 1 wt % nickel, having tensile strengths greater than 830 MPa (120 ksi), and having excellent low-temperature toughness. For example, such steels are described in a European Patent Application published Feb. 5, 1997, and having International application number: PCT/JP96/00157, and International publication number WO 96/23909 (08.08.1996 Gazette 1996/36) (such steels preferably having a copper content of 0.1 wt % to 1.2 wt %), and in a pending U.S. patent application with a priority date of Jul. 28, 1997, entitled "Ultra-High Strength, Weldable Steels with Excellent Ultra-Low Temperature Toughness", and identified by the USPTO as Application Ser. No. 09/123625 and published in WO 99/05335.

For any of the above-referenced steels, as is understood by those skilled in the art, as used herein "percent reduction in thickness" refers to percent reduction in the thickness of the steel slab or plate prior to the reduction referenced. For purposes of explanation only, without thereby limiting this invention, a steel slab of about 25.4 cm (10 inches) thickness may be reduced about 50% (a 50 percent reduction), in a first temperature range, to a thickness of about 12.7 cm (5 inches) then reduced about 80% (an 80 percent reduction), in a second temperature range, to a thickness of about 2.5 cm (1 inch). Again, for purposes of explanation only, without thereby limiting this invention, a steel slab of about 25.4 cm (10 inches) may be reduced about 30% (a 30 percent reduction), in a first temperature range, to a thickness of about 17.8 cm (7 inches) then reduced about 80% (an 80 percent reduction), in a second temperature range, to a thickness of about 3.6 cm (1.4 inch), and then reduced about 30% (a 30 percent reduction), in a third temperature range, to a thickness of about 2.5 cm (1 inch). As used herein, "slab" means a piece of steel having any dimensions.

For any of the above-referenced steels, as is understood by those skilled in the art, the steel slab is preferably reheated by a suitable means for raising the temperature of substantially the entire slab, preferably the entire slab, to the desired reheating temperature, e.g., by placing the slab in a furnace for a period of time. The specific reheating temperature that should be used for any of the above-referenced steel compositions may be readily determined by a person skilled in the art, either by experiment or by calculation using suitable models. Additionally, the furnace temperature and reheating time necessary to raise the temperature of substantially the entire slab, preferably the entire slab, to the desired reheating temperature may be readily determined by a person skilled in the art by reference to standard industry publications.

For any of the above-referenced steels, as is understood by those skilled in the art, the temperature that defines the boundary between the recrystallization range and non-recrystallization range, the Tnr temperature, depends on the chemistry of the steel, and more particularly, on the reheating temperature before rolling, the carbon concentration, the niobium concentration and the amount of reduction given in the rolling passes. Persons skilled in the art may determine this temperature for each steel composition either by experiment or by model calculation. Likewise, the $Ac_1$, $Ar_1$, $Ar_3$, and $M_s$ transformation temperatures referenced herein may be determined by persons skilled in the art for each steel composition either by experiment or by model calculation.

For any of the above-referenced steels, as is understood by those skilled in the art, except for the reheating temperature, which applies to substantially the entire slab, subsequent temperatures referenced in describing the processing methods of this invention are temperatures measured at the surface of the steel. The surface temperature of steel can be measured by use of an optical pyrometer, for example, or by any other device suitable for measuring the surface temperature of steel. The cooling rates referred to herein are those at the center, or substantially at the center, of the plate thickness; and the Quench Stop Temperature (QST) is the highest, or substantially the highest, temperature reached at the surface of the plate, after quenching is stopped, because of heat transmitted from the mid-thickness of the plate. For example, during processing of experimental heats of a steel composition according to the examples provided herein, a thermocouple is placed at the center, or substantially at the center, of the steel plate thickness for center temperature measurement, while the surface temperature is measured by use of an optical pyrometer. A correlation between center temperature and surface temperature is developed for use during subsequent processing of the same, or substantially the same, steel composition, such that center temperature may be determined via direct measurement of surface temperature. Also, the required temperature and flow rate of the quenching fluid to accomplish the desired accelerated cooling rate may be determined by one skilled in the art by reference to standard industry publications.

A person of skill in the art has the requisite knowledge and skill to use the information provided herein to produce ultra-high strength, low alloy steel plates having suitable ultra-high strength and toughness for use in constructing the containers for storing and transporting PLNG of the present invention. Other suitable steels may exist or be developed hereafter. All such steels are within the scope of the present invention.

A person of skill in the art has the requisite knowledge and skill to use the information provided herein to produce ultra-high strength, low alloy steel plates having modified thicknesses, compared to the thicknesses of the steel plates produced according to the examples provided herein, while still producing steel plates having suitable high strength and suitable cryogenic temperature toughness for use in the system of the present invention. For example, one skilled in the art may use the information provided herein to produce a steel plate with a thickness of about 2.54 cm (1 inch) and suitable high strength and suitable cryogenic temperature toughness for use in constructing a storage container of the present invention. Other suitable steels may exist or be developed hereafter. All such steels are within the scope of the present invention.

Containers constructed from any suitable high strength, low alloy steel as described herein, such as any of the steels described in this Example, are sized according to the needs of the PLNG project in which the containers will be utilized. A person skilled in the art may use standard engineering practices and references available in the industry to determine the necessary dimensions, wall thickness, etc. for the containers.

When a dual phase steel is used in the construction of containers according to this invention, the dual phase steel is preferably processed in such a manner that the time period during which the steel is maintained in the intercritical temperature range for the purpose of creating the dual phase structure occurs before the accelerated cooling or quenching step. Preferably the processing is such that the dual phase structure is formed during cooling of the steel between the $Ar_3$ transformation temperature to about the $Ar_1$ transformation temperature. An additional preference for steels used in the construction of containers according to this invention is that the steel has a tensile strength greater than 830 MPa (120 ksi) and a DBTT lower than about −73° C. (−100° F.) upon completion of the accelerated cooling or quenching step, i.e., without any additional processing that requires reheating of the steel such as tempering. More preferably the tensile strength of the steel upon completion of the quenching or cooling step is greater than about 860 MPa (125 ksi), and more preferably greater than about 900 MPa (130 ksi). In some applications, a steel having a tensile strength of greater than about 930 MPa (135 ksi), or greater than about 965 MPa (140 ksi), or greater than about 1000 MPa (145 ksi), upon completion of the quenching or cooling step is preferable.

For containers that require bending of the steel, e.g., into a cylindrical shape, the steel is preferably bent into the desired shape at ambient temperature in order to avoid detrimentally affecting the excellent cryogenic temperature toughness of the steel. If the steel must be heated to achieve the desired shape after bending, the steel is preferably heated to a temperature no higher than about 600° C. (1112° F.) in order to preserve the beneficial effects of the steel microstructure as described above.

The desired variables for a PLNG container, e.g., size, geometry, material thickness, etc., are dependent upon operating conditions such as internal pressure, operating temperature, etc., as will be familiar to those skilled in the art. For the most demanding low temperature designs, the DBTT of the steel and the welds is very important. For designs with somewhat higher operating temperatures, toughness is still an important issue, but the DBTT requirements will likely be less demanding. For example, when the operating temperature increases, the required DBTT will also increase.

In order to construct containers for use in the present invention, a suitable method of joining the steel plates is employed. Any joining method that will provide joints with adequate strength and fracture toughness for the present invention, as discussed above, is considered to be suitable. Preferably a welding method suitable for providing adequate strength and fracture toughness to contain said pressurized liquefied natural gas is used to construct containers of the present invention. Such a welding method preferably includes a suitable consumable wire, a suitable consumable gas, a suitable welding process, and a suitable welding procedure. For example, both gas metal arc welding (GMAW) and tungsten inert gas (TIG) welding, which are both well known in the steel fabrication industry, can be used to join the steel plates, provided that a suitable consumable wire-gas combination is used.

In a first example welding method, the gas metal arc welding (GMAW) process is used to produce a weld metal chemistry comprising iron and about 0.07 wt % carbon, about 2.05 wt % manganese, about 0.32 wt % silicon, about 2.20 wt % nickel, about 0.45 wt % chromium, about 0.56 wt % molybdenum, less than about 110 ppm phosphorous, and less than about 50 ppm sulfur. The weld is made on a steel, such as any of the above-described steels, using an argon-based shielding gas with less than about 1 wt % oxygen. The welding heat input is in the range of about 0.3 kJ/mm to about 1.5 kJ/mm (7.6 kJ/inch to 38 kJ/inch). Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the GMAW process is used to produce a weld metal chemistry comprising iron and about 0.10 wt % carbon (preferably less than about 0.10 wt % carbon, more preferably from about 0.07 to about 0.08 wt % carbon), about 1.60 wt % manganese, about 0.25 wt % silicon, about 1.87 wt % nickel, about 0.87 wt % chromium, about 0.51 wt % molybdenum, less than about 75 ppm phosphorous, and less than about 100 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using, an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

In another example welding method, the tungsten inert gas welding (TIG) process is used to produce a weld metal chemistry containing iron and about 0.07 wt % carbon (preferably less than about 0.07 wt % carbon), about 1.80 wt % manganese, about 0.20 wt % silicon, about 4.00 wt % nickel, about 0.5 wt % chromium, about 0.40 wt % molybdenum, about 0.02 wt % copper, about 0.02 wt % aluminum, about 0.010 wt % titanium, about 0.015 wt % zirconium (Zr), less than about 50 ppm phosphorous, and less than about 30 ppm sulfur. The welding heat input is in the range of about 0.3 kJ/mm to about 1.5 kJ/mm (7.6 kJ/inch to 38 kJ/inch) and a preheat of about 100° C. (212° F.) is used. The weld is made on a steel, such as any of the above-described steels, using an argon-based shielding gas with less than about 1 wt % oxygen. Welding by this method provides a weldment having a tensile strength greater than about 900 MPa (130 ksi), preferably greater than about 930 MPa (135 ksi), more preferably greater than about 965 MPa (140 ksi), and even more preferably at least about 1000 MPa (145 ksi). Further, welding by this method provides a weld metal with a DBTT below about −73° C. (−100° F.), preferably below about −96° C. (−140° F.), more preferably below about −106° C. (−160° F.), and even more preferably below about −115° C. (−175° F.).

Similar weld metal chemistries to those mentioned in the examples can be made using either the GMAW or the TIG welding processes. However, the TIG welds are anticipated to have lower impurity content and a more highly refined microstructure than the GMAW welds, and thus improved low temperature toughness.

In one embodiment of this invention, submerged arc welding (SAW) is used as a joining technique. A detailed discussion about SAW can be found in Chapter 6 of the Welding Handbook, Volume 2, Welding Processes, 8th ed., American Welding Society, pages 191–232 (1995).

Submerged arc welding (SAW) is a welding technique that is often used for its advantage of high metal deposition rate. It can be more economical for certain applications because more welding material can be applied per unit time than for other welding techniques. One potential drawback for SAW, when used to join ferritic steels for low temperature applications, is insufficient or variable toughness. The low toughness can be caused by factors such as large grain size and/or higher than desired inclusion content. The large grain size is created by the high heat input aspect of SAW which is also the feature that enables high deposition rate. One other potential problem with SAW when applied to heat sensitive, high strength steel, is HAZ softening. The high heat input feature of SAW causes more extensive softening in the HAZ as compared to gas metal arc welding (GMAW) or tungsten inert gas (TIG) welding.

For some PLNG container designs, the SAW technique may be suitable. The decision to use SAW will be based primarily on a balance of economics (weld deposition rate) versus achieving adequate mechanical properties. It is possible to tailor a specific SAW welding procedure to a particular PLNG container design. For example, if it is desired to limit HAZ softening and reduce weld metal grain size, a SAW procedure can be developed that utilizes an intermediate heat input. Instead of enabling the very high deposition rates at heat inputs above about 4 kJ/mm (100 kJ/in), heat inputs in the range of about 2 kJ/mm to about 4 kJ/mm (50 kJ/in to 100 kJ/in) might be used. At values lower than this intermediate range, SAW would likely become less desirable than GMAW or TIG welding.

SAW can also be used with an austenitic weld metal. Weld toughness is somewhat easier to achieve due to the high ductility of the face centered cubic austenite. One drawback of an austenitic weld consumable is the expense which is higher than for most ferritic consumables. The austenitic material contains significant amounts of expensive alloys like Cr and Ni. However, it may be possible for a particular PLNG container design, to offset the austenitic consumable expense with the higher deposition rate allowed by SAW.

In another embodiment of this invention, electron beam welding (EBW) is used as a joining technique. A detailed discussion about EBW can be found in Chapter 21 of the Welding Handbook, Volume 2, Welding Processes, 8th ed., American Welding Society, pages 672–713 (1995). Several inherent features of EBW are particularly suited for use in service conditions requiring both high strength and low temperature toughness.

A problem relating to the welding of most high strength steels, i.e., steels having yield strengths greater than about 550 MPa (80 ksi), is the softening of the metal in the heat-affected zone (HAZ) resulting from many conventional welding processes, such as shielded metal arc welding (SMAW), submerged arc welding (SAW), or any of the gas shielded processes, such as gas metal arc welding (GMAW). The HAZ may undergo local phase transformation or annealing during welding-induced thermal cycles, leading to a significant, i.e., up to about 15 percent or more, softening of the HAZ as compared to the base metal prior to exposure to the heat of welding. While ultra-high strength steels have been produced with yield strengths of 830 MPa (120 ksi) or higher, many of these steels fail to meet the weldability requirements necessary for extreme low temperature service, such as those required for piping and pressure vessels for use in the processes disclosed and claimed herein. Such materials typically have a relatively high Pcm (a well-known industry term used to express weldability), generally greater than about 0.30, and sometimes above 0.35.

EBW mitigates some of the problems resulting from conventional welding techniques, such as SMAW and SAW. Total heat input is significantly less than arc welding processes. This reduction in heat input reduces the alteration of many properties of the steel plates during the joining process. In many cases, EBW produces a welded joint that is stronger and/or more resistant to brittle fracture in cold temperature services than similar joints produced by arc welding.

EBW, when compared to arc welding the same joint, results in a reduction of residual stresses, HAZ width, and mechanical distortion of the joint, along with a potential improvement in HAZ toughness. The high power density of EBW also facilitates single pass welding, thus also minimizing the time the base metal of the steel plates are exposed to elevated temperatures during the joining process. These features of EBW are important in minimizing the deleterious effects of welding on heat sensitive alloys.

Furthermore, EBW systems usinig reduced pressure or high vacuum welding conditions result in a high purity environment reducing weld pool contamination. The reduction of impurities in the electron beam welded joint results in enhanced weld metal toughness produced by reducing the amount of interstitial elements and inclusions.

EBW is also extremely flexible in that a great number of process control variables may be independently controlled (e.g. vacuum level, working distance, accelerating voltage, beam current, travel speed, beam spot size, beam deflection, etc.). Assuming proper joint fit-up, no filler metal is required for EBW thus resulting in a welded joint of homogeneous metallurgy. However, shims of filler metal can be used to intentionally alter the metallurgy of the EBW joint and enhance mechanical properties. Strategic combinations of beam parameters and use/omission of shims permits tailoring of the weld metal microstructure to produce the desired combination of strength and toughness.

The overall combination of excellent mechanical properties and low residual stresses also permits elimination of post weld heat treatment in many cases, even when the thickness of the plates joined is one to two inches or more.

EBW may be conducted at high vacuum (HV), medium vacuum (MV), or no vacuum (NV). HV-EBW systems produce welds with a minimum of impurities. However, high vacuum conditions can cause loss of critical volatile elements (e.g. chromium and manganese) when the metal is in the molten state. Depending on the composition of the steel to be welded, the loss of a portion of certain elements may impact the mechanical performance of the weld. Furthermore, these systems tend to be large and unwieldy, and difficult to use. NV-EBW systems are mechanically less complicated, more compact, and generally easier to use. However, NV-EBW processing is more limited in its application in that the beam tends to diffuse, scatter, and become less focused and less effective when exposed to air. This tends to limit the thickness of plates that may be welded in a single pass. NV-EBW is also more susceptible to weld impurities which may result in welds with lower strength and toughness than higher vacuum EBW. Therefore, MV-EBW is the preferred option for construction of the containers of the claimed invention. MV-EBW offers the best balance of performance and weld quality.

In another embodiment of this invention, laser beam welding (LBW) is used as a joining technique. A detailed discussion about LBW can be found in Chapter 22 of the Welding Handbook, Volume 2, Welding Processes, 8th ed., American Welding Society, pages 714–738 (1995). LBW offers many of the same advantages as EBW, but is more limited in application in that currently available EBW is capable of single pass welds on a wider range of plate thickness.

A person of skill in the art has the requisite knowledge and skill to use the information provided herein to weld ultra-high strength, low alloy steel plates to produce joints having suitable high strength and fracture toughness for use in constructing the containers and other components of the present invention. Other suitable joining or welding methods may exist or be developed hereafter. All such joining or welding methods are within the scope of the present invention.

While the foregoing invention has been described in terms of one or more preferred embodiments, it should be understood that other modifications may be made without departing from the scope of the invention, which is set forth in the following claims.

| Glossary of terms: | |
|---|---|
| $Ac_1$ transformation temperature: | the temperature at which austenite begins to form during heating; |
| $Ac_3$ transformation temperature: | the temperature at which transformation of ferrite to austenite is completed during heating; |
| $Ar_1$ transformation temperature: | the temperature at which transformation of austenite to ferrite or to ferrite plus cementite is completed during cooling; |
| $Ar_3$ transformation temperature: | the temperature at which austenite begins to transform to ferrite during cooling; |
| cryogenic temperature: | any temperature lower than about −40° C. (−40° F.); |
| CTOD: | crack tip opening displacement; |
| CVN: | Charpy V-notch; |
| DBTT (Ductile-to-Brittle Transition Temperature): | delineates the two fracture regimes in structural steels; at temperatures below the DBTT, failure tends to occur by low energy cleavage (brittle) fracture, while at temperatures above the DBTT, failure tends to occur by high energy ductile fracture; |
| EBW: | electron beam welding; |
| essentially pure: | substantially 100 vol %; |
| $Gm^3$: | billion cubic meters; |
| GMAW: | gas metal arc welding; |
| hardening particles | one or more of $\epsilon$-copper, $Mo_2C$, or the carbides and carbonitrides of niobium and vanadium; |
| HAZ: | heat affected zone; |
| intercritical temperature range: | from about the $Ac_1$ transformation temperature to about the $Ac_3$ transformation temperature on heating, and from about the $Ar_3$ transformation temperature to about the $Ar_1$ transformation temperature on cooling; |
| $K_{IC}$: | critical stress intensity factor; |
| kJ: | kilo joule; |
| kPa: | thousands of Pascals; |
| ksi: | thousands of pounds per square inch; |
| LBW: | laser beam welding; |
| low alloy steel: | a steel containing iron and less than about 10 wt % total alloy additives; |
| MA: | martensite-austenite; |
| maximum allowable flaw size: | critical flaw length and depth; |
| $Mo_2C$: | a form of molybdenum carbide; |
| MPa: | millions of Pascals; |
| $M_s$ transformation temperature: | the temperature at which transformation of austenite to martensite starts during cooling; |
| Pcm: | a well-known industry term used to express weldability; also, Pcm = (wt % C + wt % Si/30 + (wt % Mn + wt % Cu + wt % Cr)/20 + wt % Ni/60 + wt % Mo/15 + wt % V/10 + 5(wt % B)); |
| PLNG: | pressurized liquefied natural gas; |
| ppm: | parts-per-million; |
| predominantly: | at least about 50 volume percent; |
| psia: | pounds per square inch absolute; |

-continued

Glossary of terms:

| | |
|---|---|
| quenching: | as used in describing the present invention, accelerated cooling by any means whereby a fluid selected for its tendency to increase the cooling rate of the steel is utilized, as opposed to air cooling; |
| quenching (cooling) rate: | cooling rate at the center, or substantially at the center, of the plate thickness; |
| Quench Stop Temperature: | the highest, or substantially the highest, temperature reached at the surface of the plate, after quenching is stopped, because of heat transmitted from the mid-thickness of the plate; |
| QST: | Quench Stop Temperature; |
| SAW: | submerged arc welding; |
| SALM: | single anchor leg mooring; |
| slab: | a piece of steel having any dimensions; |
| TCF: | trillion cubic feet; |
| tensile strength: | in tensile testing, the ratio of maximum load to original cross-sectional area; |
| TIG welding: | tungsten inert gas welding; |
| $T_{nr}$ temperature: | the temperature below which austenite does not recrystallize; |
| USPTO: | United States Patent and Trademark Office; and |
| weldment: | a welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments. |

What we claim is:

1. A container for storing pressurized liquefied natural gas at a pressure of about 1035 kPa (150 psia) to about 7590 kPa (1100 psia) and at a temperature of about −123° C. (−190° F.) to about −62° C. (−80° F.), wherein said container is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

2. The container of claim 1, wherein said joints have a strength of at least about 90% of the tensile strength of said ultra-high strength, low alloy steel.

3. The container of claim 1, wherein said joints have a DBTT lower than about −73° C. (−100° F.).

4. The container of claim 1, wherein said joints are formed by gas metal arc welding.

5. The container of claim 1, wherein said joints are formed by tungsten inert gas welding.

6. A marine vessel for transporting a pressurized liquefied natural gas at a pressure of about 1035 kPa (150 psia) to about 7590 kPa (1100 psia) and at a temperature of about −123° C. (−190° F.) to about −62° C. (−80° F.), wherein said marine vessel has at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

7. The marine vessel of claim 6 having on-board equipment for converting said pressurized liquefied natural gas to a gas and delivering said gas to pipelines or users' facilities.

8. A method of processing natural gas, said method comprising the steps of:
(a) converting said natural gas to pressurized liquefied natural gas at a pressure of about 1035 kPa (150 psia) to about 7590 kPa (1100 psia) and a temperature of about −123° C. (−190° F.) to about −62° C. (−80° F.); and
(b) delivering said pressurized liquefied natural gas to at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

9. A method of transporting a pressurized liquefied natural gas, said method comprising the steps of:
(a) storing said pressurized liquefied natural gas having a pressure of about 1035 kPa (150 psia) to about 7590 kPa (1100 psia) and a temperature of about −123° C. (−190° F.) to about −62° C. (−80° F.) in at least one storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas, and wherein said at least one storage container is on-board at least one marine vessel; and
(b) propelling said at least one marine vessel across a body of water.

10. The method of claim 9, wherein said marine vessel has on-board equipment for converting said pressurized liquefied natural gas to a gas and delivering said gas to pipelines or users' facilities.

11. The method of claim 9 further comprising the step of:
(c) delivering said pressurized liquefied natural gas to an import terminal, wherein said import terminal has at least one import storage container that is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

12. The method of claim 11, wherein said import terminal has vaporizing equipment for converting said pressurized liquefied natural gas to a gas.

13. A system for processing natural gas, said system comprising:
(a) a processing plant for converting said natural gas to pressurized liquefied natural gas at a pressure of about 1035 kPa (150 psia) to about 7590 kPa (1100 psia) and at a temperature of about −123° C. (−190° F.) to about −62° C. (−80° F.); and
(b) a plurality of storage containers for receiving said pressurized liquefied natural gas from said processing plant, wherein said plurality of storage containers are constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas.

14. The system of claim 13, wherein said processing plant consists essentially of:

(i) reception facilities for receiving said natural gas and removing liquid hydrocarbons from said natural gas;

(ii) dehydration facilities for removing sufficient water vapor from said natural gas to prevent freezing of said natural gas during said processing; and (iii) liquefaction facilities for converting said natural gas to said pressurized liquefied natural gas.

15. The system of claim 14, wherein said processing plant further consists of:

(iv) treating equipment for removal of at least one compound selected from the group consisting of carbon dioxide, sulfur-containing compounds, n-pentane plus, and benzene.

16. A system for transporting pressurized liquefied natural gas, said system comprising:

(a) at least one storage container for containing said pressurized liquefied natural gas having a pressure of about 1035 kPa (150 psia) to about 7590 kPa (1100 psia) and a temperature of about −123° C. (−190° F.) to about −62° C. (−80° F.), said at least one storage container being constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas; and (b) at least one marine vessel for transporting said at least one storage container containing said pressurized liquefied natural gas.

17. The system of claim 16, wherein each said marine vessel has on-board vaporizing equipment for converting said pressurized liquefied natural gas to a gas and said system further comprises an import terminal consisting essentially of gas transfer facilities for transferring said gas to pipelines or users' facilities.

18. A container for storing pressurized liquefied natural gas at a pressure of about 1725 kPa (250 psia) to about 7590 kPa (1100 psia) and at a temperature of about −112° C. (−170° F.) to about −62° C. (−80° F.), said container being constructed by joining together a plurality of discrete plates of a low-alloy, high-strength steel containing less than about 2 wt % nickel and having adequate strength and fracture toughness to contain said pressurized liquefied natural gas, wherein joints between said discrete plates have adequate strength and toughness at said pressure and temperature conditions to contain said pressurized liquefied natural gas.

19. A method for processing and transporting natural gas, said method comprising the steps of:

(a) processing said natural gas by converting it into pressurized liquefied natural gas having a pressure of about 1725 kPa (250 psia) to about 7590 kPa (1100 psia) and a temperature of about −100° C. (−148° F.) to about −62° C. (−80° F.);

(b) placing said pressurized liquefied natural gas into a plurality of storage containers at a first location, wherein said plurality of storage containers have adequate strength and toughness to contain said pressurized liquefied natural gas at said pressure and temperature conditions; and (c) transporting said plurality of storage containers containing said pressurized liquefied natural gas away from said first location toward a second location.

20. A system for processing and transporting natural gas comprising:

(a) a processing plant for converting said natural gas to pressurized liquefied natural gas having a pressure of about 1725 kPa (250 psia) to about 7590 kPa (1100 psia) and a temperature of about −100° C. (−148° F.) to about −62° C. (−80° F.);

(b) a plurality of storage containers for receiving said pressurized liquefied natural gas, wherein said plurality of storage containers have adequate strength and toughness to contain said pressurized liquefied natural gas at said pressure and temperature conditions; and (c) at least one marine vessel adapted for holding and transporting said plurality of storage containers containing said pressurized liquefied natural gas.

21. Pressurized liquefied natural gas derived from a process for liquefying natural gas to produce said pressurized liquefied natural gas as an outlet product at a pressure of about 1725 kPa (250 psia) to about 7590 kPa (1100 psia) and a temperature of about −100° C. (−148° F.) to about −62° C. (−80° F.) and containing at least one component selected from the group consisting of (i) carbon dioxide, (ii) n-pentane plus, and (iii) benzene, in an amount that would freeze in liquefied natural gas at a pressure of about atmospheric pressure and a temperature of about −162° C. (−260° F.).

22. Pressurized liquefied natural gas derived from a process for liquefying natural gas to produce said pressurized liquefied natural gas as an outlet product at a pressure of about 1725 kPa (250 psia) to about 7590 kPa (1100 psia) and a temperature of about −100° C. (−148° F.) to about −62° C. (−80° F.), wherein said process consists essentially of the steps of (i) receiving said natural gas in reception facilities; (ii) removing sufficient water vapor from said natural gas to prevent freezing of said natural gas during said process; and (iii) liquefying said natural gas to produce said outlet product.

23. A container for storing pressurized liquefied natural gas at a pressure of about 1035 kPa (150 psia) to about 7590 kPa (1100 psia) and at a temperature of about −123° C. (−190° F.) to about −62° C. (−80° F.), wherein said container is constructed by joining together a plurality of discrete plates of materials comprising an ultra-high strength, low alloy steel containing less than 9 wt % nickel and having a tensile strength greater than 830 MPa (120 ksi) and a DBTT lower than about −73° C. (−100° F.), wherein joints between said discrete plates have adequate strength and toughness at said pressure and temperature conditions to contain said pressurized liquefied natural gas, and further wherein said joints have a strength of at least about 90% of the tensile strength of said ultra-high strength, low alloy steel.

* * * * *